US008144632B1

(12) United States Patent
Chapweske et al.

(10) Patent No.: US 8,144,632 B1
(45) Date of Patent: Mar. 27, 2012

(54) METHODS, SYSTEMS AND PROGRAM PRODUCTS FOR EFFICIENT COMMUNICATIONS DURING DATA SHARING EVENT

(75) Inventors: Adam M. Chapweske, Minneapolis, MN (US); Jon N. Swanson, Queensbury, NY (US)

(73) Assignee: Insors Integrated Communications, Chicago, IL (US)

( * ) Notice: Subject to any disclaimer, the term of this patent is extended or adjusted under 35 U.S.C. 154(b) by 77 days.

(21) Appl. No.: 11/903,915

(22) Filed: Sep. 25, 2007

Related U.S. Application Data

(63) Continuation-in-part of application No. 11/477,069, filed on Jun. 28, 2006, and a continuation-in-part of application No. 11/477,169, filed on Jun. 28, 2006.

(60) Provisional application No. 60/847,061, filed on Sep. 25, 2006.

(51) Int. Cl.
H04L 12/18 (2006.01)
H04M 3/56 (2006.01)
H04N 7/15 (2006.01)
G06F 15/177 (2006.01)

(52) U.S. Cl. .............. 370/261; 370/238; 379/202.01; 709/204

(58) Field of Classification Search .......... 370/260, 370/261, 236; 379/202.01; 709/204
See application file for complete search history.

(56) References Cited

U.S. PATENT DOCUMENTS

| 5,353,283 | A | 10/1994 | Tsuchiya |
| 6,128,644 | A * | 10/2000 | Nozaki .......................... 709/203 |
| 6,195,680 | B1 | 2/2001 | Goldszmidt et al. |
| 6,317,777 | B1 | 11/2001 | Skarbo et al. ................. 709/204 |
| 6,587,827 | B1 | 7/2003 | Hennig et al. .................. 705/26 |
| 6,725,284 | B2 | 4/2004 | Arndt |
| 6,728,221 | B1 | 4/2004 | Shaffer et al. |
| 6,760,309 | B1 * | 7/2004 | Rochberger et al. .......... 370/235 |
| 6,870,916 | B2 * | 3/2005 | Henrikson et al. ....... 379/202.01 |
| 6,965,614 | B1 | 11/2005 | Osterhout et al. |
| 7,277,901 | B2 | 10/2007 | Parker et al. .................. 707/203 |

(Continued)

OTHER PUBLICATIONS

Rosenberg et al., "SIP: Session Initiation Protocol", Network Working Group Request for Comments: 3261, Jun. 2002.*
Postel, "Internet Control Message Protocol", Network Working Group Request for Comments: 792, Sep. 1981, pp. 1-21.*
M. Humphrey et al. "State and Events for Web Services: A Comparison of Five WS-Resource Framework and WS-Notification Implementations," 14$^{th}$ IEEE International Symposium on High Performance Distributed Computing (HPDC-14). Research Triangle Park, NC, 24-27 (Jul. 2005).

(Continued)

Primary Examiner — John Pezzlo
Assistant Examiner — Matthew Campbell
(74) Attorney, Agent, or Firm — Greer, Burns & Crain, Ltd.

(57) ABSTRACT

One example embodiment of the invention is a method for communicating streaming data between a plurality of users participating in a real-time communications event over a packet based data network, the method comprising the steps of: a source identifying a first sink corresponding to a request, the request including at least a method, one or more method parameters, and a time to live value; the source using a sink data repository to identify a first sink address corresponding to the first sink, the sink data repository comprising sink addresses for a plurality of different sinks; the source communicating the request to said first sink; and, the first sink returning an error message if the time to live has expired, and if the time to live has not expired the first sink processing the request through one or more steps of: acting as a resource by executing the method using the method parameters and communicating a response to the source; acting as a filter by forwarding the request to a second sink; and, redirecting the request back to the source for communicating to a second sink.

13 Claims, 13 Drawing Sheets

TTL SPECIFIES
CLOCK TIME

U.S. PATENT DOCUMENTS

| | | | |
|---|---|---|---|
| 7,317,695 | B2 | 1/2008 | Mayer et al. |
| 7,561,522 | B1 * | 7/2009 | Cotter .......................... 370/236 |
| 2003/0108002 | A1 * | 6/2003 | Chaney et al. ................ 370/261 |
| 2003/0126291 | A1 | 7/2003 | Wang et al. |
| 2004/0111472 | A1 | 6/2004 | Swanson et al. ............. 709/204 |
| 2004/0117446 | A1 | 6/2004 | Swanson ....................... 709/205 |
| 2004/0210637 | A1 | 10/2004 | Loveland |
| 2004/0230896 | A1 | 11/2004 | Elza et al. ..................... 715/511 |
| 2005/0022204 | A1 | 1/2005 | Kabir et al. |
| 2005/0044503 | A1 | 2/2005 | Richardson et al. |
| 2006/0039335 | A1 * | 2/2006 | Ono et al. ..................... 370/338 |
| 2006/0104221 | A1 | 5/2006 | Norton |
| 2006/0268695 | A1 | 11/2006 | Dhesikan et al. |
| 2007/0005711 | A1 | 1/2007 | Hassounah et al. ........... 709/206 |
| 2007/0050448 | A1 | 3/2007 | Gonen et al. .................. 709/204 |
| 2007/0168524 | A1 | 7/2007 | Chao et al. .................... 709/228 |
| 2007/0201365 | A1 * | 8/2007 | Skoog et al. ............... 370/230.1 |
| 2007/0217589 | A1 | 9/2007 | Martin et al. |
| 2009/0117927 | A1 | 5/2009 | Li et al. |

OTHER PUBLICATIONS

"The Role of the Globus Toolkit® in the Grid Ecosystem," The Globus Alliance, published on the World Wide Web at http://www.globus.org/grid_software/role-of-gt.php, (believed published circa 2005) The month of publication is not presently available, but the year of publication is sufficiently earlier than the effective U.S. filing date and any foreign priority date so that the particular month of publication is not in issue.

"An Ecosystem of Grid Components," The Globus Alliance, published on the World Wide Web at http://www.globus.org/grid_software/ecology.php, (believed published circa 2005) The month of publication is not presently available, but the year of publication is sufficiently earlier than the effective U.S. filing date and any foreign priority date so that the particular month of publication is not in issue.

"About the Globus Toolkit," The Globus Alliance, published on the World Wide Web at www.globus.org/toolkit/about.html; (believed published circa 2005) The month of publication is not presently available, but the year of publication is sufficiently earlier than the effective U.S. filing date and any foreign priority date so that the particular month of publication is not in issue.

Ian Foster et al. "A Distributed Resource Management Architecture that Supports Advance Reservations and Co-Allocation," published on the World Wide Web at http://www.globus.org/alliance/publications/papers/iwqos.pdf#search=%22a%20distributed%20resource%20management%20architecture%22 (1999) The month of publication is not presently available, but the year of publication is sufficiently earlier than the effective U.S. filing date and any foreign priority date so that the particular month of publication is not in issue.

"Common Object Request Broker Architecture (CORBA) Manual v3.0; Chapters 1, 2" published on the World Wide Web at http://www.omg.org/docs/formal/02-06-05.pdf (Jul. 2002).

"CORBA® Basics", Object Management Group, Inc., Published on the world wide web at: http://www.omg.org/gettingstarted/corbafaq.htm (believed published circa 1997-2006) The month of publication is not presently available, but the year of publication is sufficiently earlier than the effective U.S. filing date and any foreign priority date so that the particular month of publication is not in issue.

Warren Smith, Ian Foster, Valerie Taylor, "Scheduling with Advanced Reservations," International Parallel and Distributed Processing Symposium (IPDPS '00), (2000). The month of publication is not presently available, but the year of publication is sufficiently earlier than the effective U.S. filing date and any foreign priority date so that the particular month of publication is not in issue.

Karl Czajkowski, Ian Foster, Carl Kesselman, "Resource Co-Allocation in Computational Grids" (HPDC) (1999) The month of publication is not presently available, but the year of publication is sufficiently earlier than the effective U.S. filing date and any foreign priority date so that the particular month of publication is not in issue.

Warren Smith, Valerie Taylor, Ian Foster, "Using Run-Time Predictions to Estimate Queue Wait Times and Improve Scheduler Performance," Published on the world wide web at: http://www.globus.org/alliance/publications/papers/p.pdf#search=%22using%20run-time%20predictions%20to%20estimate%20queue%22 (1999) The month of publication is not presently available, but the year of publication is sufficiently earlier than the effective U.S. filing date and any foreign priority date so that the particular month of publication is not in issue.

W3C, "SOAP Version 1.2 Part 0: Primer," W3C Recommendation, published on the world wide web at: http://www.w3.org/TR/soap12-part0/ (believed published circa Jun. 2003).

Tarak Modi, "Clean up your wire protocol with SOAP, Part 1: An introduction to SOAP basics," published on the wide web at: http://www.javaworld.com/javaworld/jw-03-2001/jw-0330-soap.html (believed published circa 2001) The month of publication is not presently available, but the year of publication is sufficiently earlier than the effective U.S. filing date and any foreign priority date so that the particular month of publication is not in issue.

Joseph M. Jacob, "CORBA/e: Not Your Father's Distributed Architecture," published on the web at: http://www.elecdesign.com/Articles/Index.cfm?AD=1&ArticleID=12702 (believed published circa Jun. 2006).

Don Box, "A Young Person's Guide to The Simple Object Access Protocol: SOAP Increases Interoperability Across Platforms and Languages," published on the web at: http://msdn.microsoft.com/msdnmag/issues/0300/soap/soap.asp; (believed published circa 2000). The month of publication is not presently available, but the year of publication is sufficiently earlier than the effective U.S. filing date and any foreign priority date so that the particular month of publication is not in issue.

Li Qi, Hai Jin et al., "HAND: Highly Available Dynamic Deployment Infrastructure for Globus Toolkit 4," published on the world wide web at: http://www.globus.org/alliance/publications/papers/HAND-Submitted.pdf-search=%22hand%3A%20highly%20available%2 (believed published circa Jun. 2006).

Ann Chervenak, Ian Foster et al. "The Data Grid: Towards an Architecture for the Distribued Management and Analysis of Large Scientific Datasets," published on the web at: http://loci.cs.utk.edu/dsi/netstore99/docs/papers/chervenak.pdf-search=%22the%20data%20grid%3A%20towards (1999) The month of publication is not presently available, but the year of publication is sufficiently earlier than the effective U.S. filing date and any foreign priority date so that the particular month of publication is not in issue.

Ian Foster, Carl Kesselman, Steven Tuecke, "The Anatomy of the Grid," published on the world wide web at: http://www.globus.org/alliance/publications/papers/anatomy.pdf; (2001) The month of publication is not presently available, but the year of publication is sufficiently earlier than the effective U.S. filing date and any foreign priority date so that the particular month of publication is not in issue.

Ian Foster, "Globus Toolkit Version 4: Software for Service-Oriented Systems," IFIP International Federation for Information Processing (2005) The month of publication is not presently available, but the year of publication is sufficiently earlier than the effective U.S. filing date and any foreign priority date so that the particular month of publication is not in issue.

Ian Foster, Carl Kesselman et al., "Grid Services for Distributed System Integration," IEEE, Jun. 2002.

Paul Z. Kolano, "Surfer: An Extensible Pull-Based Framework for Resource Selection and Ranking" In *Proc. of the 4th IEEE/ACM Intl. Symp. on Cluster Computing and the Grid*, (2004) The month of publication is not presently available, but the year of publication is sufficiently earlier than the effective U.S. filing date and any foreign priority date so that the particular month of publication is not in issue.

Rosenberg et al., "SIP: Session Initiation Protocol," Network Working Group Request for Comments: 3261, Jun. 2002, pp. 1-269.

Schulzrinne et al., "DHCP Options for SIP servers," Network Working Group Request for Comments: 3319 Jul. 2003, pp. 1-7.

Fielding et al., "Hyper Text Transfer Protocol," Network Working Group Request for Comments: 2616, Jun. 1999, pp. 1, 53.

* cited by examiner

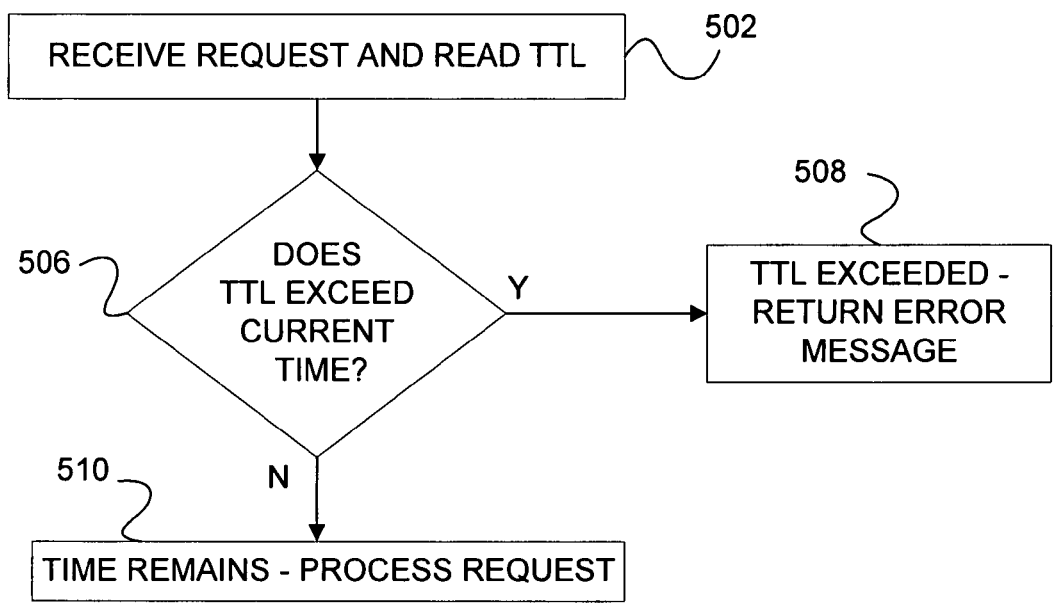
FIG. 18 - TTL SPECIFIES CLOCK TIME

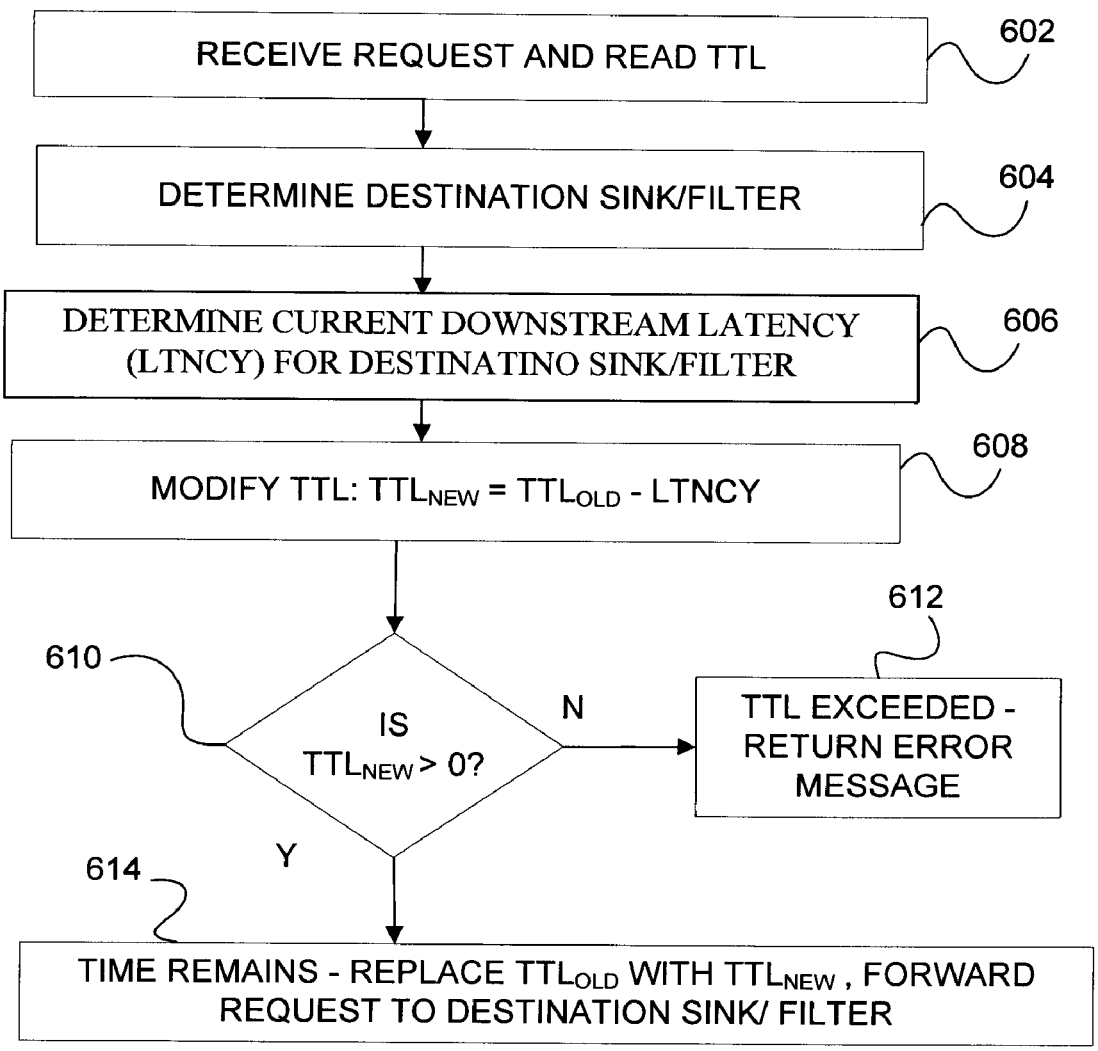
FIG. 19 - TTL SPECIFIES
ELAPSED TIME

METHODS, SYSTEMS AND PROGRAM PRODUCTS FOR EFFICIENT COMMUNICATIONS DURING DATA SHARING EVENT

CROSS REFERENCE

The present application claims priority on U.S. Provisional Application No. 60/847,061 filed on Sep. 25, 2006. The present application is also a continuation in part of co-pending U.S. application Ser. No. 11/477,069 filed Jun. 28, 2006 and a continuation in part of co-pending U.S. application Ser. No. 11/477,169 filed Jun. 28, 2006.

FIELD

A field of the invention is data communications during a data sharing event, with an example being a videoconference.

BACKGROUND

Real-time communications events including audio and/or video conferencing are known on communications networks such as packet-based networks, including internet protocol ("IP") networks. Often, these may be implemented across large networks to allow tens, hundreds, or even more individual connections to communicate with one another. Generally, a communications event application is executed at one or more locations on the data network. This application may connect users to the event, manage data flow between the users, provide some security, and perform other event management functions.

Often a client/server architecture is used wherein the server runs applications for the benefit of the client. Within some communications sharing events, participants are clients and the event application software that manages the event resides on a server computer. Often these communications events may include use of many applications, including video, audio, security, playback, data sharing, and the like. Each of these applications may require one or more software utilities running on and managed by the server. In some applications multiple event servers may be running to interface very large numbers of participants with one another. When this occurs, the servers may need to communicate and coordinate with one another. Such events may use a software component that may be referred to as a conference bridge to be running to link the users to one another. The conference bridge may, for example designate ports for communications to be routed over and otherwise control communications traffic between users.

SUMMARY

One example embodiment of the invention is a method for communicating streaming data between a plurality of users participating in a real-time communications event over a packet based data network, the method comprising the steps of: a source identifying a first sink corresponding to a request, the request including at least a method, one or more method parameters, and a time to live value; the source using a sink data repository to identify a first sink address corresponding to the first sink, the sink data repository comprising sink addresses for a plurality of different sinks; the source communicating the request to said first sink; and, the first sink returning an error message if the time to live has expired, and if the time to live has not expired the first sink processing the request through one or more steps of: acting as a resource by executing the method using the method parameters and communicating a response to the source; acting as a filter by forwarding the request to a second sink; and, redirecting the request back to the source for communicating to a second sink.

BRIEF DESCRIPTION OF THE DRAWINGS

FIG. 18 is a flowchart illustrating example steps of an additional embodiment of the invention; and, FIG. 19 is a flowchart illustrating example steps of an additional embodiment of the invention.

DETAILED DESCRIPTION OF THE PREFERRED EMBODIMENTS

Definitions

Figure 1:
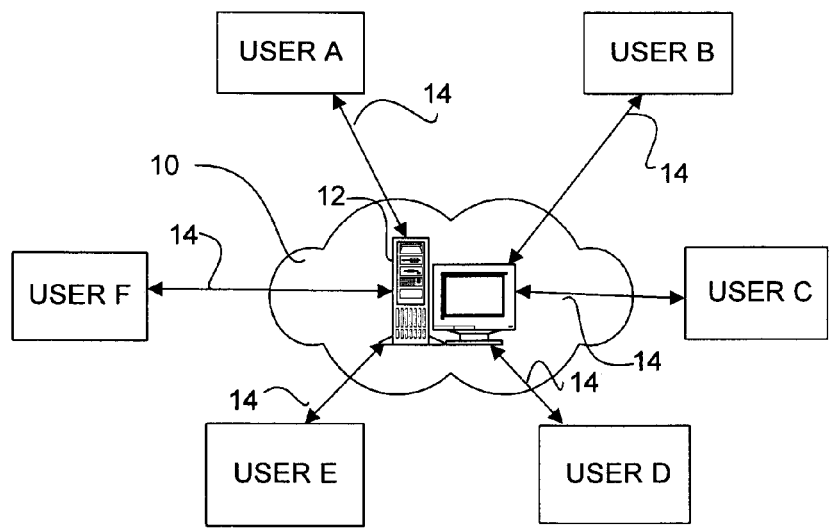
FIG. 1 is a schematic of a network useful to illustrate practice of some invention embodiments.

Before describing example embodiments of the invention in detail, it will be useful to provide some definitions that are useful to describing aspects of some invention embodiments:

Factory—a program code or subsection of program code capable of initiating and terminating a process; within a distributed configuration of sinks and filters, a factory may also be a sink or filter capable of creating other sinks or filters Filter—an object that can function as both a sink and a source.

Method—an operation.

Request-communication including a method for execution by a resource. A request may also include other parameters.

Resource—an object that can execute a method.

Sink—an object that can receive requests, send responses, and can operate as a resource.

Source—an object that can send requests and receive responses

In some embodiments of the invention, a single object can function in different capacities depending on circumstances. For example, in some embodiments a filter combines many of the above functional definitions into a single object that performs many functions (e.g., a filter may be a sink). By way of further example, a single object may be a sink when it receives a request and responds to it, a resource when it executes a requested method, a source when it communicates a request, and a filter when it forwards a request to another sink/filter/resource. Accordingly, terminology of sink, filter, source and resource can be applied as a result of function in a particular circumstance. It may also be useful to consider particular objects in terms of their relation to a particular request. For example, an object may be a request sink for a first request, and a request filter for another.

It will also be appreciated that the terms defined above have been adopted herein for describing some example embodiments of the invention. In particular, the functional terminology of sinks, filters and resources defined above is useful in describing some example invention embodiments for clarity of understanding operation of that embodiment. It will be appreciated that these terms, however, are somewhat arbitrary and should not be interpreted to limit the scope of the invention. Instead, these terms are intended to be given their broadest scope according to the definitions provided above in addition to the illustration of example invention embodiments provided herein. For example, those skilled in the art will understand that meanings other than the above definitions may likewise apply to the objects being described, and that other terms could easily be used to convey the above definitions within the scope of the present invention. One example is that each of a source, sink, filter and resource can also be referred to as a node.

Before discussing additional aspects of example invention embodiments in detail, it will also be appreciated that the present invention may be embodied in a method, a system, and/or in a computer program product. For example, a method of the invention may be carried out by one or more users using computers or by one or more computers executing steps of the invention, and a program product of the invention may include computer executable instructions that when executed by one or more computers cause one or more computers to carry out steps of a method of the invention. Further, one or more computer(s) in combination with connected hardware such as one or more of cameras, microphones, monitors, projectors, and the like that are carrying out steps of a method of the invention and/or that are running a program product of the invention may define a system of the invention. It will therefore be understood that in describing a particular embodiment of the present invention, description of other embodiments may also be made. For example, it will be understood that when describing a method of the invention, a system and/or a program product of the invention may likewise be described, and vice-versa.

Turning now to the drawings, FIG. 1 is a schematic of a network 10 that is useful to describe an example method of the invention. The network shown as a "cloud" 10 includes one or more interfaces 12 that link Users A-F to one another. Although the interface 12 has been illustrated as a computer, the term "interface" as used herein is intended to be broadly interpreted as comprising one or more components for linking communications between users. It may include, for example, one or more computers having a plurality of communication ports, a software component running on one or more computers that facilitate communications, a networking card(s), a modem(s), and the like. The interface 12 can be referred to in the video/audio conferencing and networking arts as a "bridge" which can be, for example, a software component running on a server or router that controls one or more ports for interconnecting the Users A-F. As used herein the term port is intended to be broadly interpreted as a physical or logical destination and/or origination point for digital communications. Examples of ports include but are not limited to, network cards, an IP address, a TCP or UDP port number, and the like. A bridge may also comprise software useful to link users that may, for example, specifies one or more ports for communication between those users.

The network 10 may be a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may the internet, a private network, a public network, a virtual private network, or the like. Also, the protocol between the bridge 12 and the Users A-F may be that of a server and client.

The network 10 may be useful for a number of data communication purposes. In an example application, the network 10 is useful to facilitate a real-time communications session, such as a video or audio conference, between one or more of the Users A-F. Examples of a video communications session include a videoconference wherein two or more of the Users A-F share streaming video and/or audio communications in real-time. As used herein the term "real-time" is intended to broadly refer to a condition of generally corresponding to actual time. For example, data can be real-time if it takes about one minute of data playback to describe an event that took about one minute to occur. Real-time data may be, but is not necessarily, "live" data that is generated and communicated substantially contemporaneously with minimal or no delay. As an example, delay of less than 1.0, 0.5, 0.25 or other time values may be considered real-time. In a videoconference, for example, multiple participants may be sending and receiving live real-time video and audio data to one another— each is talking to one or more of the others in real-time with delay at a suitably minimal level so that "conversations" between users over the network can take place in real time.

Communications with each of the Users A-F may be carried out on a 2-way basis from the network 10, with data sent to and received from each of the Users A-F over the communications lines 14. These may comprise physically wired connections such as copper wires, optical fiber cables, or the like; or may be wireless connections. Real-time video, audio, and other data may be communicated from each of the Users A-F to all others of the Users A-F through the bridge 12 and over the communications lines 14. A firewall 16 or other security device may isolate the Users A-F from the network 10.

Those knowledgeable in the art will appreciate that communications over the network 10 between the Users A-F may be carried out in any of a number of generally known procedures. For example, known methods of one or more of uni, multi, or broad-cast may be used. Also, the data may be streaming. In a streaming video communications session application, each user A-F may have one or more cameras, telephones and/or microphones from each of which is streamed a continuous, real-time data on a particular multicast address and port number. As used herein the term continuous data stream is intended to broadly refer to a data stream sent in substantially continuous succession, although some degree of intermittency is contemplated. For example, a packetized data stream in IP may be continuous and streaming even though there may be some delay between discrete packets. Different protocol communications may be supported by the network 10 and the users A-F, including but not limited to ITU H.320, ITU H.323, ITU H.324, SIP (session initiation protocol), RTP (real time protocol), RTSP (real time streaming protocol), RTTP (real time transport protocol), and other suitable protocol for initiating and communicating real time and streaming data. It will be appreciated that when used in this context, the term "communicated" is intended to be broadly interpreted and does not require direct communication. For example, a first user may communicate data to a second user even though the data passes through a number of intermediate nodes between origination and final destination.

Figure 2:
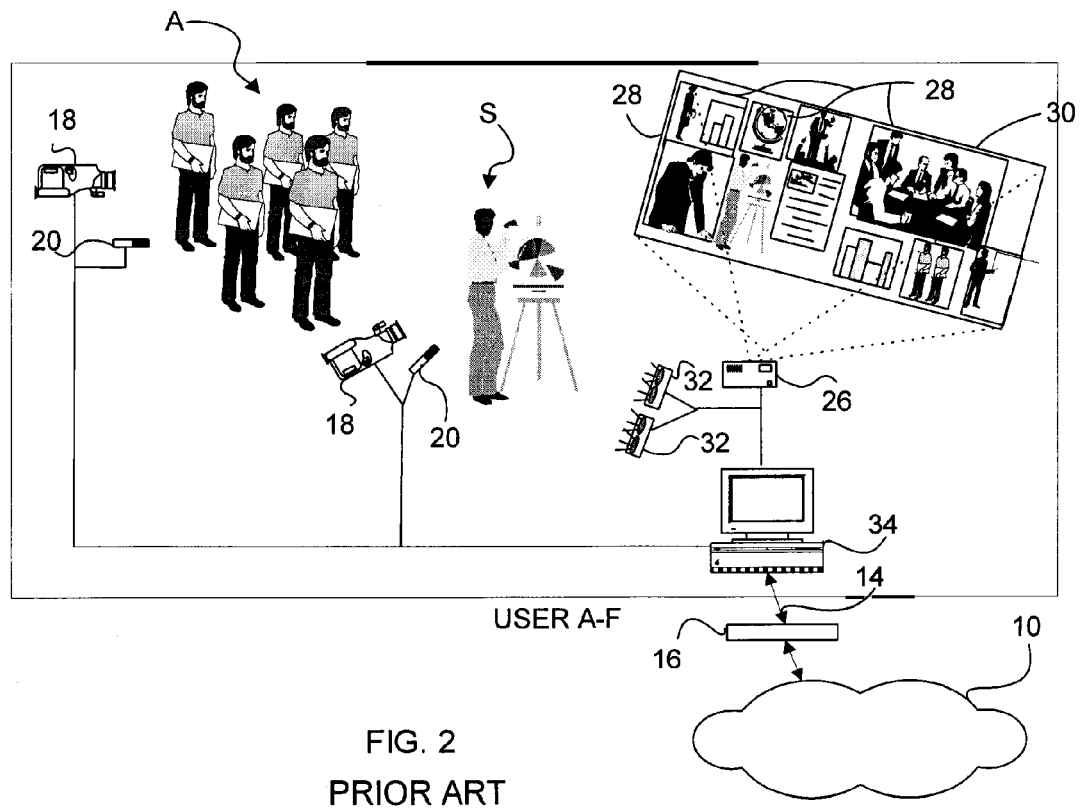
FIG. 2 is a schematic of one example video conference attendee room useful to illustrate practice of some invention embodiments.
Figure 3:
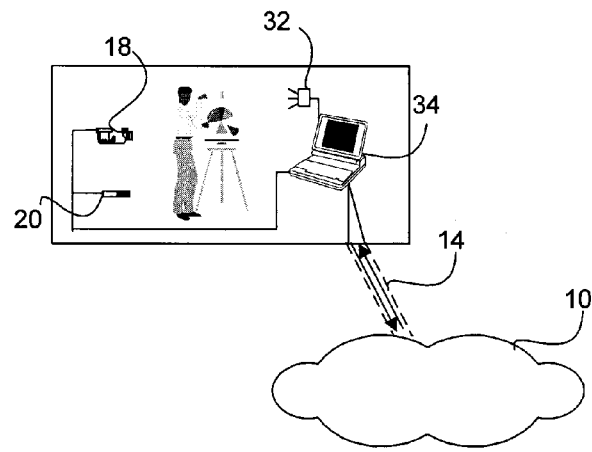
FIG. 3 is a schematic of a second example video conference attendee room useful to illustrate practice of some invention embodiments.

Communications of the streaming data between Users A-F may be further appreciated through consideration of FIGS. 2-3 that schematically show some example configurations of the Users A-F. As shown by FIGS. 2-3, the Users A-F may be conference rooms, class rooms, or other spaces in which multiple individuals gather to participate in the video communications session with other individuals that are located at others of the Users A-F. FIG. 3 illustrates an alternate configuration in which a single individual is participating in the conference from, for example, a home office, a hotel room, or other location. Each of the Users A-F can use one or more cameras 18 that are directed at an audience A, an instructor S, or other things or people. In FIG. 3, only an audience A is present (which may be only one individual). Many different cameras will be appropriate for practice of an example invention embodiment, with suitable examples including those available from LOGITECH Co., Fremont Calif. (e.g., Logitech QuickCam Pro 4000), the SONY EVI D100 series and/or the CANON VC series of remote pan/tilt cameras, and the like. With reference to FIG. 2, the cameras 18 at one User A-F may be trained on different people or things at that location, with an example being one camera 18 at an audience A and one camera 18 at a speaker S. The cameras may be controllable remotely, so that User A may be able to direct the direction of a camera 18 at User B, for instance. At other locations, with examples shown in FIG. 3, only one camera 18 is present.

In FIG. 2, two microphones 20 are provided-one for receiving audio from the instructor S and a second for receiving audio from the audience A. There are a wide variety of suitable microphones available for practice of embodiments of the invention, including by way of example SONY ECM microphones, POLYCOM microphones, and the like. Although not illustrated, those knowledgeable in the art will appreciate that other cameras, microphones, computers, gateways, firewalls, mixers, multi-plexers, and like devices may also be present depending on desired video communications session details and other factors.

With reference to FIG. 3, only a single camera 18 is provide and a single microphone 20 along with a laptop computer 34. This might be useful for allowing an individual to participate in a video communications session from a home office, while traveling in a hotel room or plane, or the like. The camera 18 (such as a LOGITECH QuickCam) and microphone 20 might be combined on a laptop mountable unit, for instance, and the speaker 32 (and an alternate microphone 20) might be headphones worn by the user. Suitable headphones include those available from PLANTRONICS Corp. This example configuration is particularly convenient for portable participation in video communications sessions.

In an example video communications session such as a videoconference, each of the Users A-F not only sends streaming video and audio data, but likewise receives streaming video, audio, and other data communicated from some or all of the other Users A-F. Referring once again to the schematics of FIGS. 2-3 by way of example, one or more projectors 26 may be provided to project real-time video images 28 from one or more of the other Users A-F on a screen 30.

There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being having at least 2000 lumens and XGA resolution. Also, it will be appreciated that use of a projector to display output images may easily be replaced with use of a monitor on which output video images are viewed. For example, FIG. 3 illustrates a laptop computer 34 the monitor of which may be useful to display output video data streams 28 from others of the Users A-F. One or more speakers 32 may also be provided to play real-time audio from the other users or other sources.

Any number of video images may be provided that show video data in real-time from any number of other cameras or other sources located at the other users. For example, the user A may simultaneously display output video data streams 28 from each of the other users B-F, or may choose to display on a select subset of those streams. The display of streams may be set as desired, with different output display streams 28 located in different locations on the display 30. Further, the output video streams 28 may include charts, graphs, documents, other digital files, replayed video files, and the like. Digital documents such as charts, word processor documents, spreadsheets and the like may be input to any of the computers 34 at any of the Users A-F for display at all or some of the other Users' locations. Likewise, digital images, including stored video streams and digital documents, for instance, may be stored in a memory accessible over the network 10 for replaying during the video communications session at any or all of the Users A-F. Output video streams 28 may be manipulated as desired, with examples of manipulation including moving the images, resizing the images, and the like.

A particular example of a data file in addition to audio and video data includes shared documents having text, images, numerical values, and the like. For example, within a videoconference or virtual meeting different of the Users A-F at different locations may desire to all work on a single document. In such circumstances, continuous updates of the document should be communicated between Users, with a real-time image of the document displayed.

The one or more computers 34 at each of the Users A-F may be used to receive and send all of the video, audio, documents, digital files and other data at the standard user A. The computer 34 may be referred to as a client computer or client. A variety of computers that are currently commercially available will be suitable for use as computer 34, with examples including the Dell Precision 470 with dual processors and the HP Workstation XW6000 dual processor. In some applications a portable computer such as a laptop, cellular phone, PDA or other computer may be useful.

Additionally, the computer 34 is shown for illustration only. Other devices that include a processor capable of executing instructions may be used, although they may sometimes be referred to as a device other than a "computer." Accordingly, the term "computer" as used herein with reference to computer 34 is intended to be broadly interpreted. Examples include, but are not limited to, media communications devices having a processor, communications devices such as processor enabled phones or personal digital assistants, processor based gaming devices, and the like.

An application program, including one or more codecs, may be running on the computer 34 to provide signal coding/decoding, compression/decompression, to coordinate receiving and sending of the data streams, and to control other aspects of sending and receiving of the data streams. For example, the computer 34 may be used to control which or how many video images 28 are displayed on the screen 30, to size the images 28, to set audio levels for the speakers 32, and the like. Each computer 34 may be running a video codec, an audio codec, other codecs, one or more application programs, and other programs. These may be combined into a single application program or may be separate from one another. The computer 34 may also have video and audio capture cards, with an example being WEBCAM Corp. 4 input video capture card.

According to the configurations of FIGS. 1-3, communications session such as a real-time video communications session such as a videoconference or other virtual meeting can occur between two or more of the Users A-F. The Users A-F may virtually "attend" an immersive and extensive virtual meeting that includes audio, video and/or other streaming data shared in real-time. Participants at each of the Users A-F may simultaneously hear and/or view data from all others of the Users A-F. Such meetings may be desirable for corporations, universities, government, and other groups of people located remotely from one another that find it useful to interact in an environment that allows a greater level of intimacy than an audio-only phone call or a single image video conference.

Applications for use of video communications sessions of the present invention include, but are not limited to, distance learning, medical consultation, industry collaboration, social interaction, government or university collaborative research, entertainment, and the like. In a distance learning application, a professor at one site (e.g., User A) may be able to take questions from students located and many additional sites (e.g., Users B-F), which can be locally located (e.g., different rooms or buildings in same campus) or very far from one another (e.g., different cities, states or countries).

In some communications sessions of the invention, each of the sites can view all of the other sites, and can hear a question from any other site (and see the questioner). In a medical consultation application, doctor specialists from around the country can participate in the diagnosis of a particular case. X-rays can be viewed by all, and each doctor at each location can discuss the case with all of the other participating doctors. In an industrial collaboration application, remotely located engineering, marketing, management, and labor teams may all discuss development of a new product. Each site may ask questions of any other site, and each site may submit documents and charts covering aspects of the project that they are responsible for.

Figure 4:
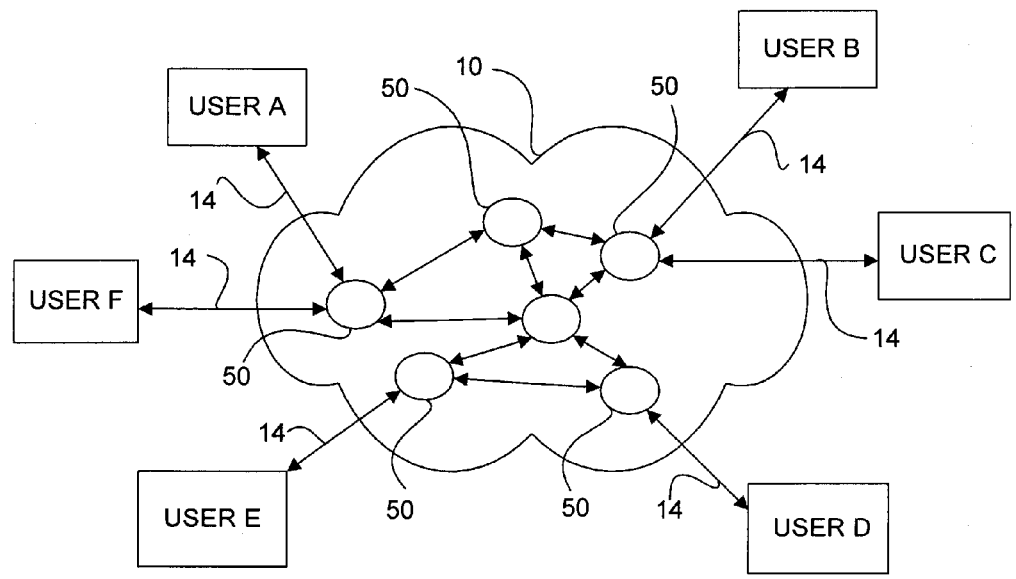
FIG. 4 is a schematic of a network useful to illustrate practice of some invention embodiments.

FIG. 4 is a schematic diagram illustrating the network 10 configured for practice of one embodiment of the invention, including a plurality of sinks and filters 50 that have been distributed over the network 10 and are operatively linked to one another and to the Users A-F, which can be considered sources. Each of the sinks and filters 50, which may also be thought of as nodes for convenience, may be located on different computers on the network 10, or two or more may be located on a single computer. It will be appreciated that the schematic of FIG. 4 (as well as other network schematics discussed herein) are simplified examples provided for use in illustrating concepts of some invention embodiments only. In practice, for instance, a single computer 34 and/or a network 10 may have dozens, hundreds, thousands or more nodes 50.

Through practice of an example embodiment of the invention, the client server architecture of the network 10 supports a distributed configuration whereby the functionality of the servers of the network has been distributed across several different network servers to result in a more stable and efficient platform for practicing real-time communications sessions such as videoconferences and other applications. In other invention embodiments, the nodes 50 may reside on a single computer. Some or each of the nodes 50 on the single computer may be independent of one another, whereby failure of one node will not cause failure of another. In such an example embodiment, advantages are achieved since the independence of each of (or at least a portion of) the nodes 50 reduces the risk of the entire system failing when any software instance (e.g., one node) encounters difficulties or crashes.

Having presented a framework in which some example embodiments of the invention can be practiced, discussion of particular example embodiments of invention can now be made. For purposes of further framing the detailed discussion of example invention embodiments that are provided below, a simplified overview of one example invention embodiment will be made with reference to FIG. 4. This example embodiment is in the art of video conferences, although it will be appreciated that the present invention is not limited to this art. Other example applications of the invention include, but are not limited to, audio conferences, data sharing, network broadcasting, and the like.

Within this example, assume that User A wishes to initiate a video conference so that it may communicate streaming data with each of Users B-F. To initiate the conference, User A, which may be considered a source, first communicates a request to the network 10 to initiate the conference by setting up a conference bridge. The request may include parameters such as the number of conference attendees, whether audio will be included, and the like. The request also includes a method for execution, which may be, for example, a GET request specifying a particular conference bridge.

In the prior art, the User A may have communicated a command to a single server on the network 10 to initiate the conference. That single server would then connect User A as well as Users B-F to the conference bridge, which would likely exist on that same server. Many other applications for supporting the video conference, with an example being a recorder for recording a video data stream, may also be located on the server.

In an example method of the invention, however, the functionality of the single server of the prior art has been distributed across the network in the form of sinks, filters and resources 50. The source User A communicates its request to initiate the conference to a filter 50 on the network 10 which forwards it to an appropriate sink or filter for processing it. When the request reaches the appropriate final sink 50, it acts as a resource by executing the request. In this example, execution of the request may include launching a conference bridge somewhere on the network 10. Subsequent requests to join the conference communicated from Users B-F will be sent to a filter 50 and subsequently forwarded to the sink 50 that acts as a resource by executing the method in the request to connect the respective user to the conference bridge.

In one example embodiment of the invention, each of the sources (Users A-F) do not necessarily have to have knowledge of the address for the ultimate destination sink for the requests they communicate to the network 10. Instead, this example embodiment exploits a method through which each node on the network is able to forward the request to an appropriate downstream node. The request may be identified using a hierarchical identifier, such as a uniform resource locator (URL). Each node may also use one or more data repositories, such as look-up tables, to identify where to forward the request to. Accordingly, each source (and filter along the path) does not necessarily have end destination address data, but instead has information useful to send the request farther along towards that end destination.

Assume that additional functionality is desired during the video conference, with an example being a desire to record the video stream being communicated from camera 16. To accomplish this, a source such as User A may communicate a request to the network with a method for execution (e.g., RECORD), and with parameters such as a specified data stream (e.g., CMRA_16). The request may be identified using an identifier that is, or includes, a URL. One or more nodes that receive the request can act as a filter and use a look-up table to determine where to forward the request to until it reaches its final destination sink which can act as a resource and execute the method in the request (e.g., record data stream CMRA_16).

In this manner, practice of an example video conference embodiment of the invention achieves useful benefits and advantages. For example, the applications supporting a video conference are distributed across the network thereby reducing dependence on any single server. Failure of a single server can be quickly overcome if redundant sinks (i.e., resources) have been deployed on the network. New applications for the video conference can be quickly enabled by launching new sinks (i.e., resources) on the network. Also, the ability to avoid network congestion is enhanced by the opportunity of each of the nodes to make intelligent forwarding decisions based on network latency. For example, if two or more sinks are available for executing a request, a given filter can select which sink to forward the request to based on network latency between the filter and the appropriate destination sinks. These and other benefits and advantages of embodiments of the present invention will be better understood through the detailed description of example invention embodiments that follows.

With the above simplified overview of one example invention embodiment having been made, more detailed discussion of other example invention embodiments and steps can now be made. FIG. 5, including parts 5(A)-(C), is a flowchart illustrating steps of one example invention method, program product and system embodiment. Reference to the schematics of FIGS. 6-8 will be useful in considering the steps of the method of FIG. 5. Now referencing FIG. 6 in addition to FIG. 5, assume that User A wishes to join or otherwise take some action with regard to a real time communications session such as a video conference that is taking place over the network 10 between multiple other users (other users not illustrated in FIG. 6). User A, which in this example embodiment may be considered a request source, can accomplish this by initially carrying out the steps shown in dashed line box 100 to communicate a request to a node 50 (which may be any one or more of a sink, filter or resource) on the network 10. Although the node 50 is on the network 10 in this example, in other example embodiments it may be at User A (e.g., on the local User A computer such as a computer 34 (FIGS. 2-3). The request includes an executable method and parameters useful to execute that method. The resource 50 will then process the request, which may include executing the method contained in the request using the parameters provided. In this example, User A can be considered a source since it communicates the request.

Data Tables

In discussing the example steps of FIGS. 5 below, reference to several tables is made. Tables are utilized in some example embodiments of the invention by different of the nodes 50 to determine information. The term "table" as used herein is not intended to require any particular format or structure, but is instead intended to be broadly interpreted as being any correlation between at least two pieces of data stored in any suitable medium. For example, a table may be a group of first data values each correlated to one or more of a group of second values stored on a digital memory such as a magnetic or optical media.

It will further be understood that any of the locator, sink, forwarding, redirect or other tables discussed herein could be replaced with other corresponding data depositories that are useful to store data. The term "data depository" when used in this context herein is intended to be broadly interpreted as meaning a collection or storage of one or more datum. Those skilled in the art will appreciate that any of multiple data depositories are appropriate for use with embodiments of the invention.

Some data tables discussed herein will include address data. Sink tables discussed below, for example, include sink address data. The term "address" as used herein is intended to be broadly interpreted. An address is not intended to be limited, for example, to any particular protocol address data. Instead, the term "address" when used in this context with an object such as a software file is intended to be broadly interpreted as meaning any data or information useful to locate that object. Examples of addresses as used herein include, but are not limited to, an IP address expressed in a character (e.g., letters, symbols, numbers) string, a URL, and a memory address, and the like.

Locator Tables

An initial step performed at the User A is translation of the request through use of a locator table. Block 102. A locator table is one example of a locator data depository that may be used in invention embodiments. The locator table may be stored in a memory of a User A computer, or in another memory. An example locator table correlates resource aliases. That is, a locator table correlates a resource alias such as "join session" to an actual resource name such as "bridge launcher 2." In some invention embodiments, resource names are formatted as URL's for efficiency, convenience and other reasons.

A request may be almost any data structure appropriate to include a method name, resource identifier, and parameters (zero or more name-value parameters), and an optional opaque body. The resource identifier can convey a hierarchical naming scheme (which a URL does), and in some embodiments, the request further embeds transport information (e.g., IP address, pipe identifier, etc) within the identifier for convenience. In many invention embodiments the request will be related to the communications of data during a real time communications session, and execution of the method contained therein will have some effect on the communications of data during the session. For example, the request may be directed to joining or initiating a video conference. The specified method may be any operation, with an example being an executable code that when executed operates on some aspect of real time communications such as facilitating a user's joining a vide conference.

In the present example, the request includes a URL, the name of a method, and parameters useful for execution of that method. A locator table may be used to resolve an alias resource URL (or other data form) to an actual resource URL (or other data form): A simplified example locator table is:

TABLE 1

| Locator Table | |
| --- | --- |
| Alias Resource URL | Actual Resource URL (translated URL) |
| \main\recorder | \host1\recorder |
| Status | \host1\bridge2\status |
| \host1\bridgelauncher | \host2\bridgelauncher |

The above example locator table would translate the request "status" to the URL: \host1\bridge2\status. Accordingly, in some invention embodiments a locator data depository or table may be thought of as a table for translating a request from an initial name or identifier (which may be, for example, a simple functional name—"status"), to a second name or identifier that is more useful to locate a sink suitable to execute that request.

It will be appreciated that Table 1 represents a simplified example only, and that in practice Locator Tables of the invention may be significantly larger, include additional data, and may otherwise differ from the example of Table 1. Also, locator tables may be in other forms and include other data. Further, some embodiments of the invention avoid use of locator tables. Some invention embodiments, for example, avoid use of aliases and simply use the corresponding actual resource URL as the resource name.

Finally, the above example locator table and discussion included each alias resource URL translating to a single actual URL. Other embodiments of the invention, however, contemplate a plurality of translated URL's corresponding to a single given alias URL. This might be useful, for example, to resolve a "Not Found" or other error response returned for the first URL—the next translated URL of the plurality returned can be tried until one is found that works. If none work, "Not Found" may finally be returned to the invoking code.

Sink Tables

Following translation through use of the locator table, a subsequent step performed at User A computer includes using a sink data depository such as a sink table to determine where to actually send the translated request to—where the appropriate sink is. Block 104. A sink may be thought of as an object or a module that can be stored in a memory. It may include logical programming code such as an executable code or routine, and/or data. Its location may thereby be specified as a memory address. The sink data depository, with an example being a sink table, can cross reference translated requests with sinks from which corresponding resources are available. Put another way, a sink data depository is useful to determine where to direct a request based on the request's name.

In some invention embodiments in which URL's are utilized, a sink table may be used to map URL patterns to the sink objects that service those URL's. Put another way, the sink table output indicates how to go about "finding" a specified resource. A simplified example sink table is:

TABLE 2

| Sink Table | |
| --- | --- |
| Translated URL | Sink Memory Address |
| \host1\recorder | 0x12FFECB |
| \host1\bridge2\status | 0x1FA3AD |
| \host2\bridgelauncher | 0x0032ABC |

In the example sink table above, the sink memory address refers to a location in a local memory. Accordingly, in this example, sinks of Table 2 are located on the same local computer as the sources. It will be appreciated that Table 2 represents a simplified and example Sink Table only, and that in practice Sink Tables of the invention may be significantly larger, include additional data, and may otherwise differ from the simple example of Table 2.

Figure 6:
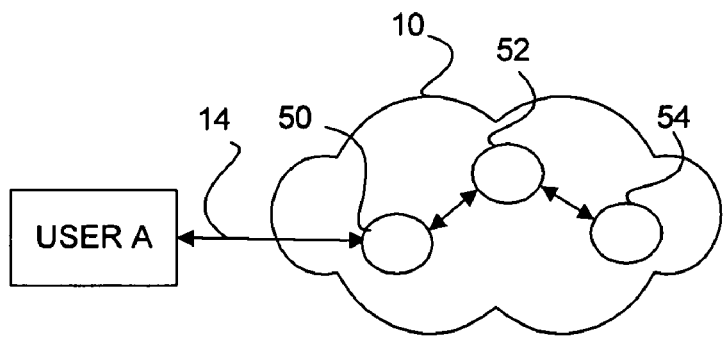
FIG. 6 is a schematic of a network useful to illustrate practice of some invention embodiments.
Figure 7:
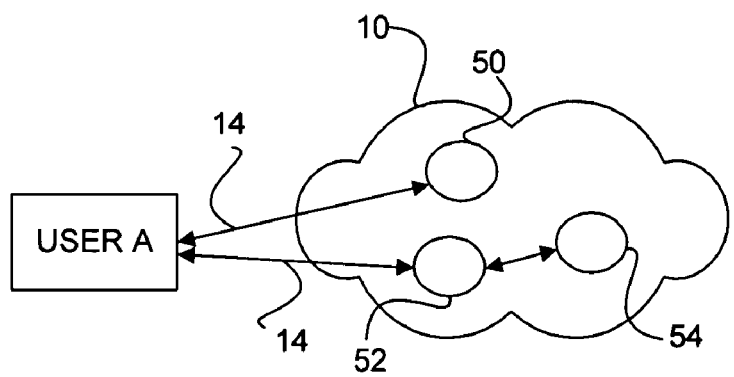
FIG. 7 is a schematic of a network useful to illustrate practice of some invention embodiments.
Figure 8:
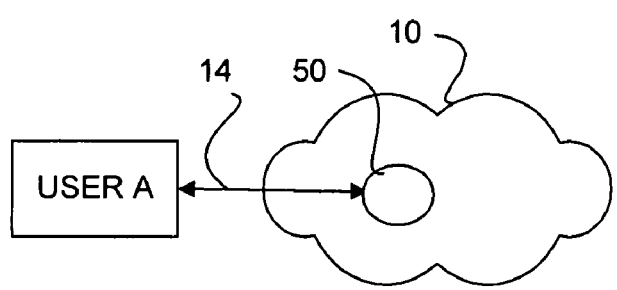
FIG. 8 is a schematic of a network useful to illustrate practice of some invention embodiments.

It will also be appreciated that in many invention embodiments, including those illustrated in FIGS. 6-8, sources and sinks will also communicate with one another over a network 10 (although in other embodiments sources, sinks and filters may reside entirely on one computer). The present invention contemplates several appropriate steps for accomplishing this. In some of these invention embodiments, the sink located at the specified sink memory address can have a communication channel open with another computer over which it transmits the request. Some sinks identified in the Sink Table using a local memory address, for example, may be "special" sinks that have a communication channel open with another computer and simply communicate every request (or selected or indicated requests) received across this channel. The receiving computer linked over the network 10 will receive this request and re-issue it from a source within a program running on it. These inter-computer sinks and sources communicate with one another over the network 10. In such embodiments, the sink table may include additional information, such as an IP address.

In another example step of source-sink communication over the network 10, one or more additional tables may be used to correlate sinks/sources to IP or other network addresses. For example, another table could be used to correlate results from a locator table to an IP address for a given URL. This or other additional information could also be contained in a single Sink Table, such as Table 2 above.

In still other invention embodiments, network address information for sinks can be extracted from the Resource URL. The translated URL or other translated data obtained from the locator table, for example, can include sufficient network address data to inform a sink where on the network that translated URL should be communicated to. Further, in addition to IP addresses, other network address data can be used. Identifiers for communication channels, such as port numbers, are one example.

A result of the above steps may be that the User A communicates the request, including the translated URL, to the sink at its corresponding sink address, which may be a memory address. Block 106. With reference to FIG. 6 by way of example in addition to Table 2, the Sink Table of TABLE 2 indicates that the sink memory address to send the request containing the URL "\host1\recorder" to is the memory location specified by address 0x12FECB, which might correspond, for example, to a local sink with a channel linking to sink 50 on network 10. The request, including the translated URL, is communicated to this actual location over the communications linkage 14.

The sink 50 then receives and processes the request. FIG. 4, dashed line Block 108. As will be described below, processing the request in this example embodiment generally includes determining what (if any) actions to take with respect to the request. Depending on circumstances, the sink may act as a filter and forward the request, redirect the request, or act as a resource and execute the method in the request.

The dashed line block 108 includes example steps of processing the request. The sink first records information regarding the received request, which may include, for example, time of reception, source received from, and the like, in a source table stored in a memory. Block 110. The receiving sink then examines the received request to determine if it should forward it, redirect it, or execute the method contained therein. This is accomplished through one or a series of steps which can be carried out in any of a variety of different sequences or particular forms. The dashed line block of 108 FIG. 5 illustrates one set of example steps. The actions it takes with respect to the particular request will determine whether the object functions as a sink or a filter with respect to that request.

In some invention embodiments, each individual sink maintains its own sink data depository in the particular form of a sink table. Other invention embodiments utilize shared sink data depositories such as tables, with one example being a centralized sink table that is accessible by a plurality of different sinks which may be located across the network, for instance. In many invention embodiments, however, a distributed configuration is desirable wherein individual nodes of the configuration are to a large extent not dependant on one another or on any other centralized sink table. In these invention embodiments, a centralized sink table presents a risk of system failure should access to that table be lost. In these invention embodiments, then, having each individual sink maintain an individual sink table is desirable.

It is also noted that some invention embodiments will avoid use of the locator table and rely instead only on the sink table.

Forwarding

A first of these example steps includes the sink consulting a forwarding table to determine if the received request should be forwarded. Block 112. If so, the sink acts as what is referred to herein as a filter. In the present invention, a filter operates to forward requests to a sink. A filter may exist as a set of executable program instructions stored on a memory, either as a stand-alone set, a sub-routine that is part of a larger set of instructions, an object in an object oriented programming environment, or the like. A filter may appear to the rest of the network 10, including other sinks and sources, as being a sink or a source. That is, another sink or a source may view a filter as a sink or a source, and for practical purposes a filter is a sink and/or a source, although a sink is not necessarily a filter. The actions taken with a particular request will determine whether a sink acts as a filter or a sink.

Put another way, if a particular object can receive requests it is a sink; if it can send requests it is a source; and if it can receive and send requests it is a filter. As discussed above, it will be appreciated that the sink, source, resource and filter terminology used herein is based on functionality as much as structure. For example and as detailed above, a single software object may function as all of a sink, a filter, a source and a resource.

If the receiving sink 50 is a filter, it determines if and where it should forward the request. It can do this by first determining whether it recognizes the incoming request as one that should be forwarded. This may be accomplished by performing a step of determining if all or a portion of the URL included with the request appears in a forwarding data depository, with one example being a forwarding table (block 112) which maps URL patterns to target URL's. That is, in one invention embodiment, this is accomplished by looking for patterns or roots in the URL contained in the incoming request. The forwarding table relates these patterns or roots to a forwarding destination.

For example, if an incoming request URL is "\host1\recorder," the forwarding table may recognize the "\host1\" pattern. If the request's URL matches a pattern in the forwarding table, the request's URL is translated to the corresponding target URL (FIG. 5(B), Block 114). A sink table (with an example being one similar to Table 2) is then consulted to determine a sink memory address of the sink associated with the translated URL. Block 116. The translated request is then forwarded by the filter to the indicated sink. Block 118.

These steps may be further illustrated as follows, while considering the schematic of FIG. 6 and flowchart of FIG. 5. A simplified example forwarding table is:

TABLE 3

Forwarding Table

| Incoming Request URL Pattern | Destination Sink |
|---|---|
| \host1\ | \host2\ |
| \host2\ | \host4\ |

It will be appreciated that Table 3 represents a simplified and example Forwarding Table only, and that in practice Forwarding Tables of the invention may be significantly larger, include additional data, and may otherwise differ from the example of Table 3. Also, other invention embodiments may use other forwarding data depositories that are not considered tables.

Assume a request including the URL "\host1\recorder\" is received by sink 50, which then consults its forwarding table and recognizes the pattern "\host1\" as appearing in the forwarding table, and accordingly acts as a filter. Block 112. Note that each sink 50 in the network 10 may have its own unique forwarding table. In other embodiments of the invention, one or more centralized forwarding tables may be distributed on the network for access by multiple sinks 50. The sink 50 translates the incoming request URL "\host1\recorder" to "\host2\recorder\" using the forwarding table of TABLE 3 (Block 114), and consults a sink table to determine the destination sink for the translated request URL \host2\recorder\ (Block 116). Assume that the sink 52 is identified, and the translated URL is communicated to the actual address for the sink 52. Upon reception, the receiving sink 52 records information associated with receiving the request. Block 110.

Sink 52 may be a filter for this particular request. If after receiving the request sink 52 consults a forwarding table (block 112) and recognizes a pattern from the request URL as appearing in that forwarding table. After translation and reference to a sink table (Blocks 114, 116), it may identify sink 54 as the forwarding destination sink for the twice-forwarded and translated request URL. This forwarding process may continue on until an ultimate destination sink is reached, although in FIG. 6 sink 54 is illustrated as the final destination. After a final destination sink (e.g., sink 54) has been reached and the request is processed, that sink issues a response to the filter (e.g., filter/sink 52) from which the request was forwarded. The response will in turn be forwarded along until it reaches the ultimate source (e.g., through filter/sink 50 to User A).

In some invention embodiments, each individual filter maintains its own forwarding table. Other invention embodiments utilize shared forwarding tables. In many invention embodiments, however, a distributed configuration is desirable wherein individual nodes of the configuration are to a large extent not dependant on one another. In these invention embodiments, then, having each individual filter maintain an individual forwarding table is desirable.

Redirects

In addition to consulting a forwarding table to determine if it should become a filter and forward an incoming request URL, a sink likewise can consult a redirect data depository, with one example being a redirect table, to determine if it should issue a redirect for a particular incoming request URL. This is illustrated in block 122 of FIG. 5(A). In a method of the invention, a step of redirecting is in some respects similar to a step of forwarding, except that the request is returned to the source with a complete redirect destination URL for re-sending by the source to a different sink.

In many invention embodiments, steps of forwarding are used when the destination sink depends or is functionally related in some way on the forwarding filter. Example of such dependency include accessibility (destination sink is only accessible to selected forwarding filters), a function dependency or relationship between the forwarding filter and the destination sink. Examples of functional relationships include a filter that acts as a gatekeeper for a particular sink to ensure that forwarded requests are formatted correctly, include required parameters, etc. A second example is a resource relationship wherein a forwarding filter that includes a basic recorder resource forwards record requests that require more sophisticated recorder capabilities to an appropriate sink.

In some invention embodiments, when no such sink/filter functional relationship or dependency exists, the filter will not forward a request but will instead issue a redirect. This can be advantageous in some applications for efficiency of communications—the source is closer to the destination sink when avoiding forwarding filters and instead relying on redirects.

A simplified example redirect table is:

TABLE 4

Redirect Table

| Incoming Request URL Pattern | Destination Sink |
|---|---|
| \host1\ | \host2\ |
| \host2\ | \host4\ |

As illustrated, a redirect table may have similar information to that of a forwarding table. Both tables specify new "translated" information for communicating an incoming request to its proper destination sink. One difference between the two is, again, that a forwarding table is used by a filter to forward the request to a sink closer to the ultimate resource destination, while a redirect table specifies information to be returned to the source so that the request can be re-sent to a different sink. It will be appreciated that the example forwarding table 3 and redirect table 4 presented herein are simple examples only, and that in practice forwarding and/or redirect tables may be significantly larger, include other information, and otherwise differ from these simple examples. Data depositories other than tables may likewise be utilized.

Figure 5A:
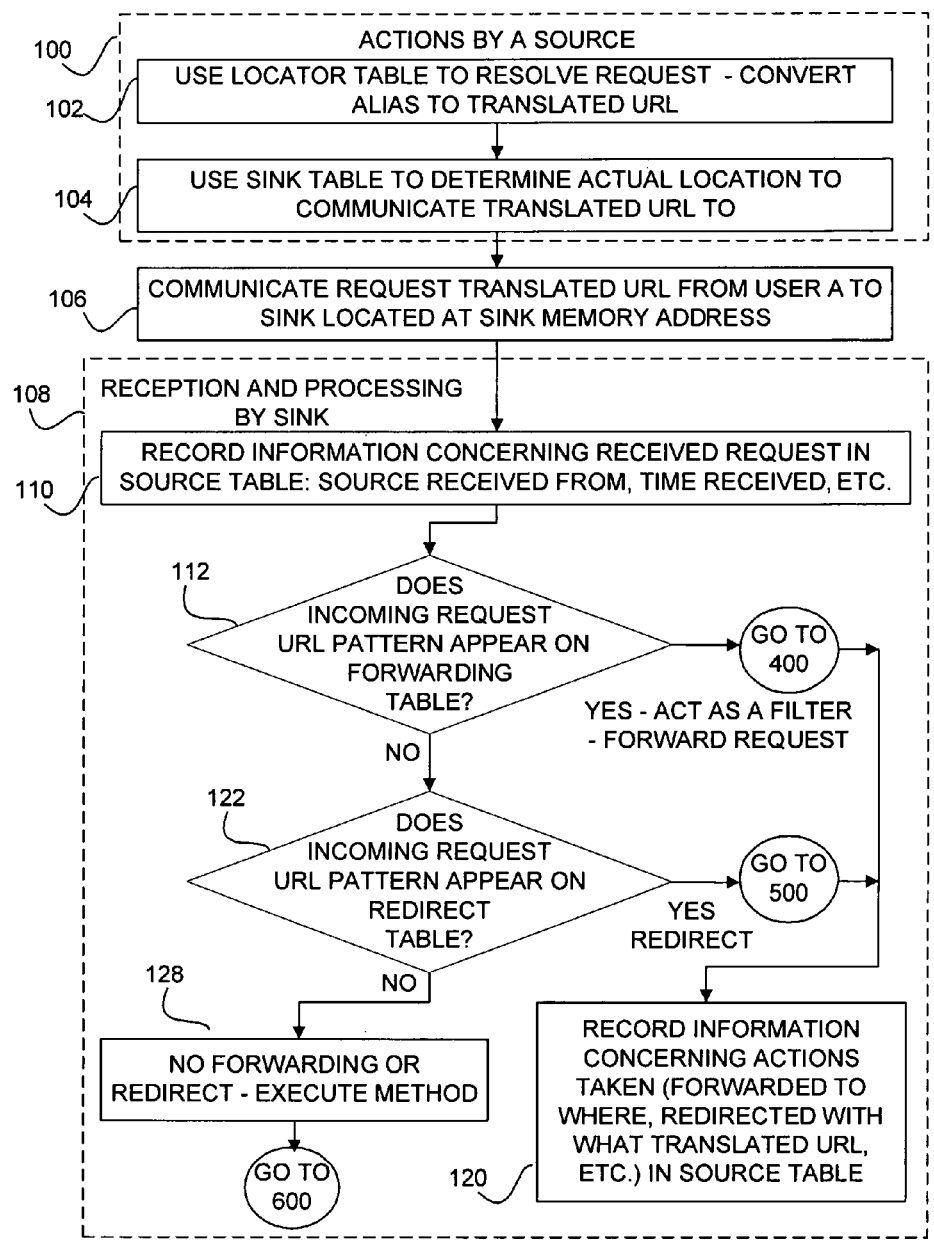
FIGS. 5A-5D are flowcharts useful to illustrate one example embodiment of the invention.
Figure 5B:
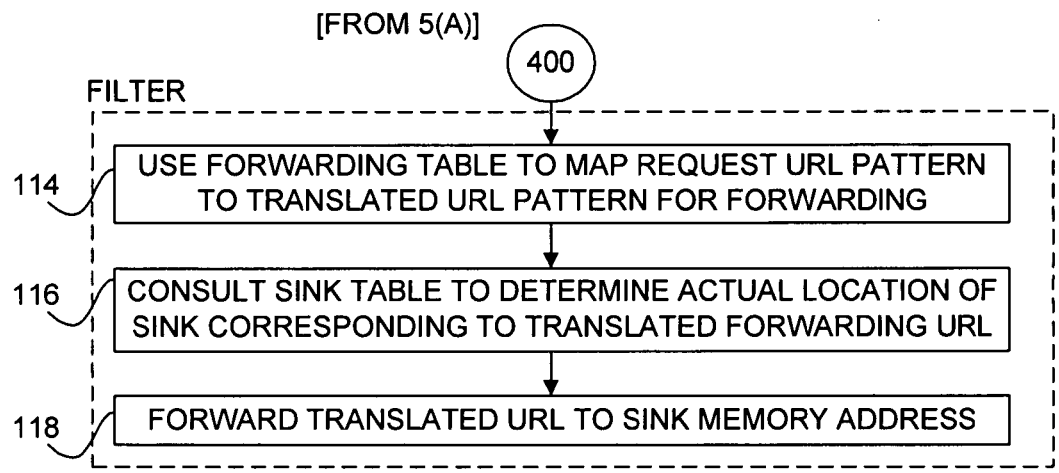
Figure 5C:
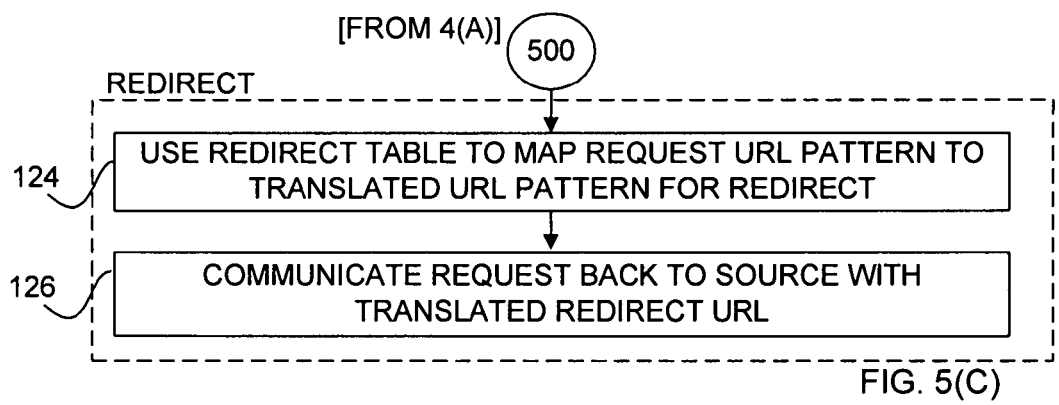

FIG. 7 in combination with FIGS. 5(A) and (C) is useful to illustrate steps of invention embodiments that include using a redirect table to redirect a request. Assume that the source User A communicates a translated request of "\host2\status" to sink 50, which has been identified in a sink table consulted by User A and located at User A. Upon reception, sink 50 consults the example redirect table of Table 4 and recognizes the "\host2\" pattern from the incoming request as appearing in the redirect table. Block 122. It accordingly translates the incoming request URL to "\host4\status" (Block 124) and communicates it back to the source User A. Block 126. The sink 50 then records information concerning its redirection actions in the source table. Block 120.

Upon reception of the "returned" message, the source recognizes this as a redirect. This may be accomplished through any of several suitable steps, including a step of marking or tagging a message as a redirect to distinguish it from standard messages. For example, one embodiment of the invention reflects the HTTP response format, wherein a status code (number) identifies a sink-to-source message as a response, redirect, or continuation. A response code may be, for example, a number in the 300-399 range. The source consults a sink table to identify sink 52 as the destination sink for this translated URL, and re-communicates the request URL to sink 52. Sink 52 then recognizes the "\host4\" pattern in its forwarding table, and forwards the request on to sink 54 which finally processes the request.

In some invention embodiments, each individual sink maintains its own redirect table. Other invention embodiments utilize shared redirect tables. In many invention embodiments, however, a distributed configuration is desirable wherein individual nodes of the configuration are essentially independent of one another (although interconnected with one another). In these invention embodiments, then, having each individual sink maintain an individual redirect table is desirable.

Resource Executes Method

If the receiving sink 50 does not recognize the received request URL in the forwarding table or the redirect table (e.g., NO responses to decision Blocks 112 and 122), then it operates as a resource and proceeds to execute the method contained in the request. Block 128. For example, the receiving sink is the resource that is subject to the received request URL and executes the method in the translated request URL. This may include, for instance, the memory location 0x12FFECB at sink 50 including a "recorder" set of program instructions that can be used to record a data stream being communicated to or from the User 1.

Those knowledgeable in the art will understand that a request may include other information and data necessary or useful to execute the method. Examples of this other information include numeric or alphanumeric data representing locations, times, logical flags, and the like. The request may also include, for example, parameters for the named method. If the method is a data stream recorder included parameters might specify, for instance, the data stream to be recorded, start and stop times, and the like.

Figure 5D:
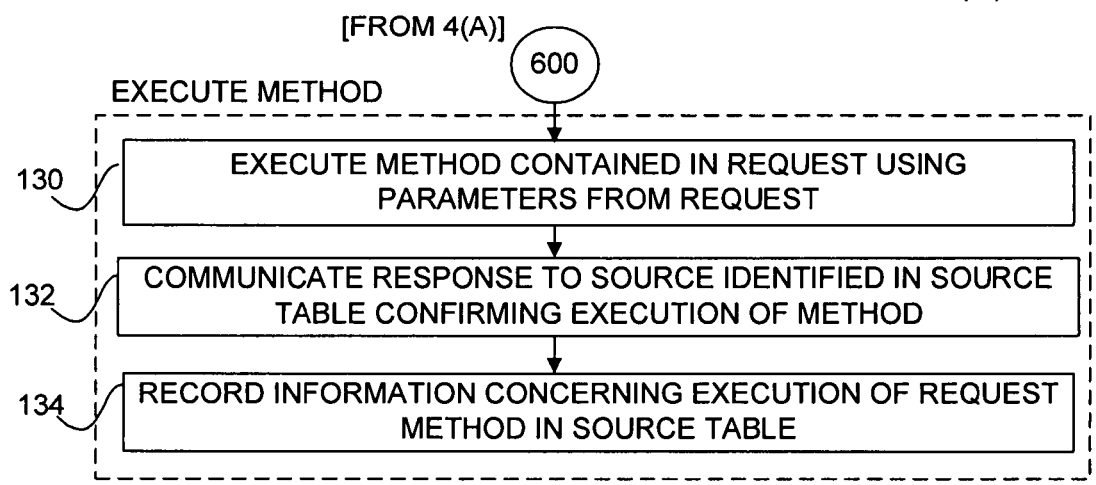

Example steps of processing the request by executing a method are illustrated in FIG. 5(D). The sink operates as a resource and executes the method in the request. Block 130. Parameters included with the request may be used to specify what the method will be performed on. The method name in the request specifies what action to be performed (with examples being an operation to perform or an executable code) and the URL specifies "who" is to perform the action (and indirectly, where it is to be performed). Other parameters may also be provided including, for example, parameters may specifying when or if execution is to take place (based on time values and also potentially based on conditional or conditioned parameters, discussed herein below), and why execution is to take place, how execution is to take place. These parameters may also supply transport and/or identification information that is supplemental to (or replaces) the main URL. If the operation manipulates source-supplied data, this can be supplied in the message "body", though it can also be passed as one of the other parameters.

The source table contains the memory address of the source associated with each pending request (a "pending" request is one for which a response or redirect has not been issued). Finally, the sink 50 communicates a response back to the source User A confirming execution of the method in the request. Block 132. The request is removed from the "pending" status upon receipt of the response. Block 134. (Note that another step of the invention may include specifying the subject request as "pending" upon its issuance from the source, or its reception by a sink or filter.) The response may confirm, for instance, one or more of the processing of the request, execution of the method, identification of the sink that processed it, time of execution, result of execution, and the like. The sink may consult the source table to identify the source to issue the response to.

FIG. 8 is a schematic in which the sink 50 may be the destination sink that communicates directly (no intervening filters or redirect sinks) with the source (User A). After processing the request, it communicates a response back to User A. The steps of blocks 128-136 may also be performed, however, by any of the sinks 52 or 54 in FIG. 6 (or FIG. 7) after receiving a forwarded (and/or redirected as in FIG. 7) request when they act as the ultimate destination sink that utilizes a resource to execute the method in the forwarded (or redirected) request. For example, sinks 50 and 52 of FIG. 6 act as filters to translate and forward a request to destination sink 54. Sink 54 is the appropriate resource and executes the method in the request. A response is then sent by sink 54 to filter 52. After receiving the response from sink 54, filter 52 may consult its source table (in which it stored information concerning the request upon its reception) to determine that the subject request it forwarded to sink 54 was received from filter 50, and may thereby forward the response to filter 50. Filter 50 may likewise repeat these steps of consulting its source table to determine that User A was the source for the subject request, and thereby forward the response to the source.

Some aspects of steps of invention embodiments related to forwarding and redirecting are appropriate for further discussion. For example, in one invention embodiment all sinks can redirect while only filters can forward. Whether a particular object (sink or filter) redirects or forwards reflects the dependency between the source and the sink. If an object can only forward, a broken downstream filter results in cutting off a potential forwarding path. If an object can only redirect (no forwarding), it may not be able to access any downstream sinks or filters (if for example, it faces downstream firewall or other security barriers). Also, if there is some functional relationship between a filter and a sink, a redirection may result in a loss of an opportunity to exploit its functional relationship with the sink. For example, the filter may practice steps of recording or modifying any request before it reaches the sink. Also, in some circumstances redirects are cacheable, with the result that future requests for the resource can be sent directly to the redirect target without involving the intermediate sink.

Also, in considering the flowcharts of FIG. 5 and others presented herein (including those discussed herein below) and the example method and program product steps discussed as they relate to sinks, filters, sources and resources, it will be appreciated that this is one example embodiment of the invention only. FIG. 5 and the steps discussed above have been illustrated with reference to the schematics of FIGS. 6-8 wherein a source may be considered a user such as User A, and sink/filter nodes are located on the network 10. It will be appreciated that this is only one possible configuration for practicing an embodiment of the invention and that many other configurations are possible.

For example, another example embodiment of the present invention is suitable for practice on a single computer that contains a plurality of sources, sinks, filters, and resources. That is, all of the sources, filters, sinks and resources are distributed across one computer. Advantages in stability are achieved when operating on a single computer. For example, the individual sources, sinks and filters may exist as stand alone software processes so that the loss of any single process will not cause the whole system to be lost. Also, computers are currently available with multiple processors and essentially can be operated as several computers bundled into one. Advancements in multi-processor systems are rapidly occurring with the result that single "boxes" are currently available four, eight, and more processors. This trend is expected to continue.

The distributed configuration of some invention embodiments are well suited to take advantage of these multi-processor machines. For example, an embodiment of the invention that includes multiple nodes distributed across a single computer having four processors will make efficient use of those four processors since each node operates as an individual software process. The computer will accordingly allow multiple of the nodes to execute requests, for example, substantially simultaneously using different of the four processors. This provides advantages over some prior art systems that included only a single software process (that combined the functionality of multiple of the present nodes) which will be executed using a single processor.

Some invention embodiments also include multiple nodes on each of several linked computers. A source on a first computer may communicate a first request to a sink on that first computer, but may communicate a second request to a second sink on a second computer. Also, systems may be configured wherein a plurality of computers are each provided with a single stand-alone set of operating sources, sinks and filters that may or may not interact with other sources, sinks and filters on other computers.

Also, one advantage of some invention embodiments is scalability. To some extent, distributed configuration of an embodiment of the present invention is independent of whether it is distributed across a single computer or more than one. Some embodiments of the invention "look" and operate the same regardless of whether they are distributed across only one or multiple computers. This lends itself well to scalability.

It will further be appreciated that the steps discussed herein and illustrated in FIGS. 5-8 represent an example invention embodiment wherein a source communicates a request to a second node which processes it. The second node may act as a filter or sink. In many invention embodiments, this process may be repeated over and over again. That is, between an originating source and a final destination more than one filter may be utilized, as well as one or more redirecting sinks. Often a large number of filters, with examples being five or more, ten or more, or greater numbers will be utilized between an originating source and a final destination sink/resource. Indeed, a benefit of some invention embodiments is the scalability of the distributed configuration. For example, the steps of dashed line box 108 may be repeated multiple times before a final destination sink is reached and the method executed. This scalability allows invention embodiments to be deployed on a very large scale where virtually any number of nodes is possible.

Sink/Filter/Resource Functionality

Still another embodiment of the invention is directed to methods, systems and program products configured to provide sinks, filters and resources with the functionality discussed herein above. An example of such an invention embodiment, for example, is directed to methods, systems and program products to be practiced by a sink in receiving a request, with an example being a method for a sink such as sink 50 receiving a request from User A illustrated by FIGS. 6-8. Example steps of one such embodiment of the invention are illustrated by the flowchart of FIG. 5 through the steps of block 108 and FIGS. 5(B0, (C), and (D). These steps may include the sink functioning as one or more of a resource (e.g., execute method), filter (e.g., forwarding), and/or a redirecting sink.

By way of additional illustration, simple example computer program code is provided with comments. This example code is also useful to illustrate how a single set of code instructions may comprise a sink, filter, and resource. This code may be stored, for example, at a memory location specified in a sink table. The example code, including comments, is:

TABLE 5

Example Computer Code

```
++++++++++++++++++++++++++++++++++++++++++++++
      Comment: section below receives the "request":
++++++++++++++++++++++++++++++++++++++++++++++
function ReceiveRequest(request)
++++++++++++++++++++++++++++++++++++++++++++++
      Comment: section below checks "Forward Table"
      to determine if code should operate as a filter and
      forward request:
++++++++++++++++++++++++++++++++++++++++++++++
if LookupInForwardTable(request)
    Forward(request)
++++++++++++++++++++++++++++++++++++++++++++++
      Comment: section below checks "Redirect Table" to
      determine if code redirect request to another sink:
++++++++++++++++++++++++++++++++++++++++++++++
    else if LookupInRedirectTable(request)
        Redirect(request)
++++++++++++++++++++++++++++++++++++++++++++++
      Comment: if not in "forward" or "redirect" tables,
      section below operates as a resource and executes
      the method - either "Play" or "Record", if method
      is not one of these return "not supported" message:
++++++++++++++++++++++++++++++++++++++++++++++
    else
        if (request.method = "PLAY")
            connection = connect(request.parameters.roomname)
            file = open(request.parameters.filename)
            data = read(file)
            write(data, connection)
            Respond( "Successfully started playing")
        else if (request.method == "RECORD")
            connection = connect(request.parameters.roomname)
            file = open(request.parameters.filename)
            data = read(connection)
            write(data, file)
            Respond( "Successfully started recording")
        else
            Respond("Method not supported")
++++++++++++++++++++++++++++++++++++++++++++++
```

Method, program product and system embodiments of the invention discussed herein above have included steps of referencing tables—locator tables, sink tables, forwarding table, and redirect tables, in relation to sink/filter/resource functionality. These steps have included, for instance, making a decision based on whether information was found in a particular table. A request is forwarded, for example, if it or a portion of it appears in a forwarding table. FIG. 5, Block 112. It will be appreciated that these are steps from one example embodiment of the invention only, and that other invention embodiments may not rely on formal tables to convey the information included in redirect, sink, locator and forwarding tables, but may utilize other logic, data sources, and the like.

Some invention embodiments, for example, eliminate use of one or more of the data depositories with examples being one or more of the tables discussed above. What some invention embodiments fundamentally have in common is that sinks, filters and resources process requests. The manner in which they do so, however, can be different-some invention embodiments utilize tables in steps of processing a request while others do not.

By way of particular example, some invention embodiments make decisions of whether to forward or redirect a method not based on whether information appears in a forwarding table, but instead on whether it can execute the method contained in the request. If it cannot, an error message may result and it may forward or redirect the request to a second sink(s). The second sink may be identified through criteria other than appearance in a forwarding or redirect table, however. For example, the first sink may simply randomly choose second sinks until one is located that executes the method. Or, it may always redirect to particular sinks.

Use of tables, however, has been discovered to be useful in many invention embodiments and has accordingly been discussed herein in detail. Such discussion, however, should not be interpreted to limit the scope of the invention. Those knowledgeable in the art will appreciate that many equivalents are possible within the scope of the invention.

In some embodiments of the invention, nodes including sinks, filters and sources may also be configured to receive requests at particular locations. These locations include, for example, ports and sockets, and may be referred to herein for convenience as a connector. Some invention embodiments include node connectors that may be configured as desired, with an example being that a sink or filter may be set to receive communications over a particular port or socket. This can be advantageous, for example, to provide nodes that are interoperable with communications of a particular protocol that is port specific. A single node may also be configured to receive requests over multiple different connectors.

Discussion is made below of some additional aspects of some example invention embodiments to provide a detailed description of practice and benefits achieved through example invention embodiments and steps.

Resources

As discussed herein above, embodiments of the present invention are believed to be of particular utility when used with real-time communications sessions wherein multiple users communicate real-time streaming data to one another. Example of such applications include video conferences in which multiple users, with examples being 2, 10, dozens, hundreds or more users simultaneously communicate streaming video, audio and other data to one another. In such applications, the stability and efficiency of an example embodiment of the invention is believed to offer valuable advantages over some systems of the prior art.

In order to further describe these particular applications of the invention, some resources useful in these applications will be described. These include:

Bridges—bridge resources provide the connection between users during a communication session. Bridges may specify particular ports or other interface locations on a network where users direct communication to for sharing.

Recorder—a recorder resource is used to record one or more specified data streams. Participants in a video conference, for example, may wish to record particular portions for replay at a later time. They can accomplish this by communicating a request for a recorder to record one or more specified data streams, with the request including parameters that include the identity of the data streams to record (e.g., RECORD (camera feed 117, audio feed 117). Other parameters might include a start and end time.

Presence—a presence resource is useful to report status of a particular user, and may also be referred to as a "status" resource. This might be used, for instance, if a conference attendee desires to know if another conference attendee remains on-line. Another example application for a status resource is when an attendee in a first conference desires to know which attendees are currently in a second conference.

Gateway—a gateway resource functions as a translator and is useful to provide interface between systems of the invention and legacy or other systems that operate using a different protocol, format or configuration. One example gateway useful in many video conference embodiments of the invention is an H.323 Gateway useful to translate between H.323 protocols and internally used videoconferencing protocol(s). An H.323 gateway resource can be used, for example, to interface a videoconference with VoIP phone users or others communicating using the H.323 protocol. A second example gateway useful in many videoconference and other invention embodiments is a SIP gateway for interfacing with those using the SIP protocol.

Authentication—An authentication resource, which may be referred to as an authenticator, can provide security functionality. An authenticator can be, for example, a filter that enforces some set of rules for blocking/forwarding requests based on whether the originating user is authorized to use the local system. This filter may perform actual authentication, which involves requesting a username/password and validating it against some preconfigured list of valid usernames/passwords. In addition to originating user, the forwarding rules may also depend on the method being executed and the destination URL. For example, some users may only be allowed to perform certain methods on certain resources (e.g., User A not allowed to record video streams, User B not allowed to adjust volume on audio streams coming from User C, etc.). Instead of, or in addition to, usernames, forwarding rules may also depend on the originating IP address, digital certificates presented by users, or other suitable indicators of identity.

RTSP Sink—This is a sink that responds to RTSP protocol requests in order to allow the source to open/close firewall ports through devices that support automatically opening/closing ports in response to RTSP communication. Use of this resource often depends on the protocol being used to communicate between sources/sinks can be made to appear as valid RTSP traffic.

HTTP Sink—This sink acts like a traditional http server, serving documents to sources. Since these can communicate directly with standard web browsers, they may be useful for debugging and configuration, for example. Use of this resource often requires that the protocol used to communicate between sources/sinks can be made to appear as valid HTTP traffic.

XML Sink—This is similar to an HTTP sink, but provides special processing of methods that allow efficient storage/retrieval/communication of named parameters via XML data structures.

Request Queue—If a sink receives a request but cannot process it immediately by executing a contained method (if, for example, not enough computing resources are currently available) but may be able to process it later, it has been discovered that an elegant configuration for accomplishing this includes steps of issuing a response whose status code indicates this situation. If it is desired that a server keep retrying until processing succeeds, distribution of one or more Request Queue filters to do so may be desirable over implementing this functionality in every individual sink or source.

Database Sink—This is a sink that supports standard database methods, such as those defined by the SQL and similar standards and protocols. A database sink can be useful, for example, to support more sophisticated steps of sharing and retrieving data from SQL protocol databases.

Interface—this is a filter that only forwards and redirects requests (no ability to execute methods). An interface resource can be useful, for example, to provide a single IP address by which to access the rest of the grid. It has been discovered that this can be useful for network administration and related purposes.

Tracer—this is a filter that only forwards requests and records the communication in a log file. Tracer resources are useful, for example, for debugging if inserted between a source and a sink in order to "trace" or record their communication. Tracers may record information including, for example, time(s) that a request passes it, source information, destination sink information, and the like.

Those knowledgeable in the art will appreciate that many other resources are possible and will be useful in practice of video conference and other applications of the invention. Discussion of these is not necessary herein and is avoided for sake of brevity. It will be understood, however, that virtually any functionality of a video conference can be incorporated as a resource in an embodiment of the invention, with particular examples including resources directed to compression or other processing of video or audio data, camera and microphone control, security, and the like. Those knowledgeable in the art further understand that video conferences and other real-time data sharing events are only example embodiments of the present invention and that many other applications will realize benefits and value from practice of the present invention.

It will be appreciated that one of the advantages of some methods, systems and program products of the invention is the ability to provide enhanced functionality by the relative ease of deployment of one or more resources on a network for use. By way of example, if it is desired to add H.323 functionality to an existing video conference system of the invention, a single (or several versions of) an H.323 gateway can be deployed onto the network for access by sources. No modification of user site (e.g., sources) or other existing software (e.g., other sinks, filters, resources) is required. Also, deployment of the gateways can be made with relatively little or no disruption of the existing system or operations.

It will also be appreciated that systems, methods and program products of the invention may include steps of launching two or more identical resources to achieve redundancy. If two or more identical resources are running, loss of one will presumably not cause loss of its functionality since the second resource can be called on. Multiple identical resources may also increase efficiency in large applications where there may be simultaneous demands for a particular resource. Also, in other embodiments of the invention where only a single version of a resource is deployed, the system remains robust since if for some reason that resource goes down all that is lost is the functionality of that resource as opposed to the entire system. The lost resource can be restarted (either manually or through a monitoring application that automatically detect the error and restart the resource). Often this can be accomplished with little or no interruption to a videoconferencing session or other communications session that is utilizing the invention embodiment.

Cancellations

Some invention embodiments further include steps of the source or client communicating a cancellation to the resource. The cancellation indicates to the resource that the source no longer desires that the method be executed. After receiving the cancellation, the resource cancels execution of the method. A cancellation might be sent, for instance, if the execution of a method has been delayed to an extent such that execution is no longer relevant, if another resource has been located to execute the method, or the like. If execution of the method was time dependent, for instance, and the critical time for executing the method has passed, the source may communicate a cancellation advising the resource that execution is no longer necessary. Cancellations may be communicated using steps consistent with communication of requests discussed herein above, including using sink tables, forwarding through filters, and the like.

By way of further example with reference made to FIG. 7, assume that User A communicated a request to sink 50 of START RECORDER (VIDEO_STRM12). After User A fails to receive a confirmation that the method has been executed for 5 or more seconds, User A may identify sink 52 that also has a recorder resource, and communicate a cancellation request to the sink 50. The parameters of the cancellation communicated to sink 50 may identify the original record request. Upon receiving the cancellation, the sink 50 acts as a resource and executes it through canceling execution of the previously received record request.

Continuations

As discussed above, in some embodiments of the invention, when a method is successfully executed by a resource, a response is communicated to the resource. Some invention embodiments include additional steps of reporting. For example, some invention embodiments include steps of reporting status to a source when there is some delay in executing a method or under other circumstances. If, for example, execution of a particular method may be delayed for a few seconds, minutes or other period of time, a "continuation" may be communicated to the source advising it that execution has been delayed. A continuation may be thought of as a status report. The continuation may include information, such as a time stamp, the name of the method to be executed, a code number corresponding to an entry in a delay table, status table or other information source, and the like.

Upon experiencing a delay, a continuation may be sent at regular intervals and/or upon passage of some initial threshold. For example, if a specified time period, with 1 or 2.5 seconds being examples, passes and the method has not been executed, a step of communicating a continuation may be performed. Further continuations may be sent every 5 seconds thereafter until the method is executed and a response is communicated. An initial time threshold and intervals for communicating responses may be set as desired, with examples including every 0.5 sec, every 1 sec, every 2.5 sec, and every 4 sec. Continuations may be communicated from the resource executing the method or from another object, such as a filter or sink whose function is to monitor execution progress.

Conditioned/Conditional Request/Notification

The concept of so-called conditional requests is generally known. For example, a client may issue a "GET" request on some status information on a conditional basis. Under such a circumstance, the client will receive the status information if some condition is satisfied. For example, a client may issue a conditional GET STATUS request on the condition that the STATUS information has changed since it was last retrieved. This can be thought of logically as being on the basis of an "if", and in fact can be accomplished in some protocols by using an "if" command in a header.

Once again referring to hypothetical computer code by way of illustrating an example, the command: "GET STATUS (007) IF MODIFIED SINCE(TIME1)" would result in data corresponding to the status of (007) being returned only if that data had been modified since (time 1). A more detailed code example of a conditional GET request is:
    GET
    HTTP://IG.INSORS.COM/USERS/ACHAPWESKE/
        STATUS.X ML HTTP/1.1 IF-MODIFIED-SINCE:
        SAT, 29 OCT 1994 19:43:31 GMT
If STATUS.XML has been modified since the specified date/time (SAT, 29 OCT1994 19:43:31 GMT), the response would be:
    HTTP/1.1 200 OK
    CONTENT-LENGTH: 41
    <ONLINEOROFFLINE>ONLINE</ONLINEOROF-
FLINE>
If, on the other hand, that resource has NOT been modified since the specified date/time, the response would be:
    HTTP/1.1 304 NOT MODIFIED
Embodiments of the present invention, however, introduce a previously unknown step of performing a "conditioned" request. A conditioned request, as used in the present disclosure, may be broadly thought of as a logical "when" as opposed to an "if." That is, a conditioned request asks for information not on satisfaction of an "if" condition, but instead upon satisfaction of a "when" condition. Again referring to hypothetical computer code by way of illustrating an example, the conditioned command: "GET STATUS(007) WHEN MODIFIED" would result data corresponding to the status of (007) being returned only when that data is modified. The above example detailed code example of a conditional request can be altered through a step of an invention embodiment to be re-expressed as a conditioned request as follows:
    GET
    HTTP://IG.INSORS.COM/USERS/ACHAPWESKE/
        STATUS.X ML HTTP/1.1 WHEN-MODIFIED
In this case, when (not "if") STATUS.XML is modified the response would be:
    HTTP/1.1 200 OK
    CONTENT-LENGTH: 41
    <ONLINEOROFFLINE>ONLINE</ONLINEOROF-
FLINE>
As illustrated through these examples, steps of a conditioned request have advantages over a conditional request in some applications with one example being once required to be communicated once to "wait" for a change, as opposed to being communicated multiple times to "look" for a change.

Conditioned requests have been discovered to have significant benefit and utility in some real-time communications session embodiments of the present invention, with a particular example being a multi-user video conference. When practicing a method of the invention using traditional client-server architecture, clients generally cannot communicate directly with one another to obtain certain information. Although direct communication can potentially be made between clients, such communications can be complicated. Typical client-server architecture relies on clients requesting that actions be performed by a server, and one client requesting information directly from another client(s) (i.e., requesting another client to take an action) conflicts with this general architecture. Instead, in typical client-server architecture applications, clients generally rely on indirect communication with other clients through a server. A first client requests the server to report some information about a second client, such as status. This can complicate and slow notifications, however.

For example, one user may desire to know when a second user joins or leaves a data communications session such as a videoconference. This can be difficult when operating within a traditional client-server architecture. In such circumstances, a first client might be required to continually send a request to a server, with an example being: "GET STATUS(USER2)." Some efficiency might be achieved by using a conditioned request: "GET STATUS(USER2) IF CHANGED SINCE (TIME1)" to reduce the reported STATUS data (which in one video conference application can be thought of as availability status—is User2 available to participate in a video conference?). Under either alternative, however, requests have to be continually sent to monitor the status of user2. This situation of repeated or even continuous polling consumes bandwidth and requires frequent actions on the part of the client and server (or source and sink).

Some methods, systems and program products of the invention, however, provide improvement through conditioned requests in a client-server architecture. For example, a conditioned request may be used to request a notification in a real-time communications session. The above illustrated commands of the prior art, for instance, can be replaced with the conditioned request: "GET STATUS(USER2) WHEN CHANGED." A conditioned request of the invention need only be sent once, and a responsive report of status of user2 will only be made when (i.e., not "if") that status changes. A conditioned request may include one or more parameters that define the "condition" to be satisfied before the method is executed, with an example being the condition that STATUS (USER2) (e.g., availability status) must change before the GET method is executed in the above example conditioned request.

Particular examples of conditioned requests that may be practiced in invention embodiments include conditioned notifications, status requests and the like. One particular example of a conditioned request in a method, system and program product of the invention is a conditioned status request communicated by one user to a sink concerning a second user. Referring to FIG. 4 by way of illustration, user A may communicate a request including the conditioned availability status request to "GET STATUS (USER_B) WHEN CHANGED" to a sink on the network 10. The sink may be identified through steps as discussed above, including the use of a locator table, a sink table, one or more filters, and the like. Upon reception by the corresponding resource, the method is executed with the result that the status of "USER_B" is communicated back to the source (User A) when that status changes.

Conditioned requests are applicable to other requests in addition to GET requests illustrated above. Also, conditioned requests may be based on conditions other than a time parameter as was illustrated in the above examples. One example is comparison of an identifier that indicates the version of a resource. For example, a "does not equal," "when-none-match" or similar logical operator can be used in a conditioned request with a header parameter. The result of use of such an operator is to compare the values specified. When the compared values don't match the condition is satisfied.

One such conditioned request example useful in invention embodiments compares version numbers of resources between the most recent known to a source and the most recent known to or available from a sink. If the version numbers don't match, a modified version is available. For example, a GET response can return a "tag" header from a resource that specifies an ID that uniquely identifies the current version of that resource (e.g., "Tag: ABCXYZ123"). When the resource is modified, its tag changes. A GET response can also include the tag(s) of the version(s) of the resource currently known to the source (e.g., GET Tag(Recorder_3) when TAG Does_Not_Equal: ABCXYZ123). When the tag of the resource at the sink or on the server differs from those currently known (e.g., "when-none-match" or "not-equal-to"), a response is issued.

This operates similar to the above illustrated "When-Modified-Since" operator, except an opaque identifier condition is relied on instead of a time value. This can be advantageous in some situations, with one example being when a resource is modified within one second of an issued response—if the timestamp's resolution is 1 second, there is an opportunity to miss a modification or get an extraneous copy if relying on a "when-modified-since" condition.

It will be appreciated that in addition to the distributed configuration of sinks, sources and filters illustrated above, conditioned requests are also useful in traditional client-server configurations, including in real-time streaming data communications events such as video-conferences.

Discovery

Like many other applications, real time communications sessions such as multi-user video and audio conferences generally require some means of resource discovery. A particular user or other entity may need to determine what resources are available to it. Some systems of the prior art utilize what is known as a registry. Each resource registers with a central memory or registry, which can then be queried by a user to determine what resources are available. In many video conference methods and systems of the prior art, for example, every conference server may register each of its applications with a registry. Such methods and systems, however, have limitations which can be detrimental in some circumstances.

For example, the registry may not be current. Some applications may have gone offline or otherwise lost availability without notifying the registry. Other resources may have come on-line and not yet been registered. Further, the central registry may become inaccessible or be compromised, with the result that all queries of it will fail or return erroneous information. Other problems exist.

Embodiments of the present invention address these shortcomings through novel discovery steps. In one invention embodiment, discovery may be carried out through use of a "list" request or method communicated by a user or source. The list request is sent to one or more sinks, which respond by identifying every resource known to it. For example, a source may consult a sink table and communicate a request including the list method to each sink identified in the sink table. Receiving sinks may execute the list method by identifying each resource currently known to it. Each of the sinks may communicate this data back to the source. These steps may also include use of filters, forwarding tables, and other steps as discussed herein above with reference to communication between sources and sinks.

The result of these steps are that through use of a "list" request or method sources are able to compile an accurate and current resource map of the network that identifies every currently available resource. Sources may send out list requests or methods at some selected interval to regularly update their resource map of the network. Steps of the invention methods may also include communicating a list method or request at other times. For example, a list method may be communicated at the start of a communications session such as a video conference, when a user joins a communications session such as a video conference, when a user is having difficulty finding a particular resource, and the like. Sources may also communicate conditioned or conditional list requests.

Although these steps allow methods, systems and program product of the invention to avoid registries, embodiments of the present invention also contemplate use of registries. This may be useful, for example, to make program products of the invention compatible with legacy systems and architectures that rely on registries. Methods of the invention may include steps of, for instance, registering resources with a registry so that systems and program products of the invention may interoperate with legacy systems.

In many invention embodiments, LIST requests are communicated just as any other request (e.g., use of locator and sink tables as discussed above). Many times a LIST request is intended to provide information concerning a specific set of resources rooted at some specific URL. In these instances, the LIST request is communicated to that root URL using the usual mechanism involving locator and sink tables discussed above. The receiving sink then reports all resources sinks/known to it, which are all related to the root URL of interest. In these circumstances, it is useful to use a locator table because the resource "aliases" it conveys may be just as important as the "actual" URLs of the resources themselves. It may be useful to not know whether a URL refers to an actual resource or is just an alias to another URL. In some other applications, the alias may not be important and the locator table can be bypassed and instead consult only the sink table.

Orchestration

As discussed above, some methods, systems and program products of the invention may result in networks adopting a distributed configuration for conducting a real-time communications session such as an audio or video conference. Once so configured, the network includes a plurality of sinks/resources distributed across it that are accessible to the sources for executing methods.

Some methods, program products, and systems of the invention further include steps of orchestration of multiple resources. As used herein, the term "orchestration" is intended to be broadly interpreted as coordinating. Orchestration may include, for example, effectively creating a composite resource by combining operation of multiple individual resources.

Example steps of orchestration may include a source communicating a request that includes a method that can be executed using multiple resources. When a destination sink receives the request, it recognizes the methods as calling for orchestration, and uses locator tables, sink tables and the like to identify other required resources. It then communicates requests to these resources, which may include use of filters and the like. The method may then be executed using the plurality of orchestrated resources all at one time, or through a series of executions using different of the resources in sequence, or through other particular steps.

Steps of orchestration through a sequential operation may be useful to address some problems of the prior art related to known methods of orchestration. For example, in one known method of orchestration a system can be put into an unknown state upon a failure in one component of an orchestration process. In some prior art orchestration schemes, an orchestrator X may requests servers A, B, and C to perform an action. If servers A and B succeed but server C fails, the action as a whole has failed, yet the system is left modified (through the actions of A and B).

One embodiment of the present invention addresses this by using filters for orchestration. As opposed to issuing requests to A, B, and C, one embodiment of the present invention includes steps of an orchestrator (e.g., a source) practicing sequential orchestration. The orchestrator forwards a request to sink A, which recognizes the request as requiring orchestration and additional resources B and C. Sink A acts as a filter and forwards the request to sink B, which in turn acts as a filter and forwards the request to sink C. After receiving the request, each sink/filter verifies that it is capable of successfully performing the action required before it forwards the request. In other steps, the sink/filter actually executes the method in the request, but prevents the effects of the execution from taking place. Once the filter receives a success response from its downstream orchestration partners, it applies the effects of the action.

Those knowledgeable in the art will appreciate that withholding effects of execution can be practiced through a variety of steps as are known. Referring to operations that modify a data structure by way of example, instead of directly modifying individual pieces of the data structure as instructions were executed, a copy of the data structure could be made and individual portions of the copy sequentially modified. Only when all of these modifications have been successfully made is the actual data structure overwritten with the temporary copy.

Embodiments of the present invention include individual sinks performing on some specific, limited task in a request. If it is desired for a server to perform a relatively complicated task, it can be divided into a series of sub-tasks that are then executed through orchestration. For example, assume that a system of the invention includes a Bridge Factory that creates bridges, and an Xml Sink that maintains a list of created bridges in an easy-to-manipulate XML data structure. A request to launch a bridge and enter its existence into the XML data structure might include orchestration to ensure that requests that result in successful bridge creation/destruction also result in the appropriate data manipulation requests to the Xml Sink. Perhaps the Xml Sink is a filter that modifies its data structure when it sees a request that is known to result in bridge creation/destruction, and it applies such changes when it sees a "success" response from the Bridge Factory. In another case, orchestration may occur by a filter that receives a bridge creation request, forwards it to the Bridge Factory, and issues a data modification request to the Xml Sink.

Accordingly, the present invention provides numerous benefits and advantages over the prior art. A distributed configuration is achieved that offers benefits related to stability, ease of implementation, efficiency and others over systems of the prior art. These benefits and advantages may be achieved whether the nodes are distributed across a single computer or they are distributed across a plurality of computers networked together. Those skilled in the art will appreciate that the example embodiments described and discussed herein have been selected as being representative only, and that the invention is not limited to these examples. For instance, although example invention embodiments have been illustrated that utilize particular protocols, other similar protocols may also be used within the scope of the invention.

By way of additional example, although data sharing event invention embodiments have been illustrated with particular numbers of meeting attendees and data streams, it will be appreciated that the method of the invention may be practiced on any practical scale. Invention methods and program products may be practiced, for example, with virtual meetings that include ten or more, dozens, hundreds, or more conference rooms and/or attendees, and with real time data streams that outnumber those illustrated herein. Applications in addition to audio and videoconferences are contemplated. Also, it will be appreciated that although example method and program products have been illustrated in particular sequences of steps, the sequence is not necessary to the invention and could easily be altered. Computer program embodiments of the invention are also not limited to a single computer, but may be practiced by a plurality of computers.

Factories:

An additional aspect of the invention is directed to factories useful for launching and terminating applications. As used herein, the term "factory" is used for convenience to describe a program code or subsection of program code that is capable of initiating and terminating a process. That is, a factory "makes" a process, where a process may be an executable computer program or set of executable instructions capable of executing a request or otherwise carrying out some steps. For example, within a distributed configuration of one invention embodiment, a factory can be a sink or filter capable of creating other sinks or filters. It will therefore be appreciated that many other terms could likewise be used to refer to what is described using the term factory herein for convenience, and that the use of this term should not unduly limit the scope of the invention.

Factories can be further illustrated through example. Assume that a system of the invention is being used to support a multi-user videoconference over a data network. The conference will require one or more conference bridges on the network to facilitate real-time communications between the multiple users. In some systems of the prior art, these bridges would be statically deployed beforehand—the network may have, for instance, 10 bridges deployed on it. In other systems of the prior art, the bridges would be created at the start-up of the video conference.

Systems, methods and program products of the invention contemplate a different approach through use of factories. Factories can dynamically create resources only as and when needed, which resources can then be destroyed when no longer needed. Such dynamic and temporary creation of resources by factories has several advantages and benefits. These include, for instance, knowledge of actual relevant parameters at the time of creation of the resource, efficient use of resources, and reduced risk of encountering a bug through a reduced resource lifetime.

For example, some embodiments of the invention useful for practicing real time videoconferencing include steps of launching, initiating, or otherwise creating a conference bridge only when a first user logs on to a particular conference, and ending or destroying that bridge when (or shortly after) the last user connected to it disconnects. The conference bridge is therefore only consuming network resources when needed—it does not exist before or after the conference is being conducted. The bridge can also be tailored to the particular needs of the conference attendees, which may be determined, for example, through the parameters specified in the request received.

Figure 9:
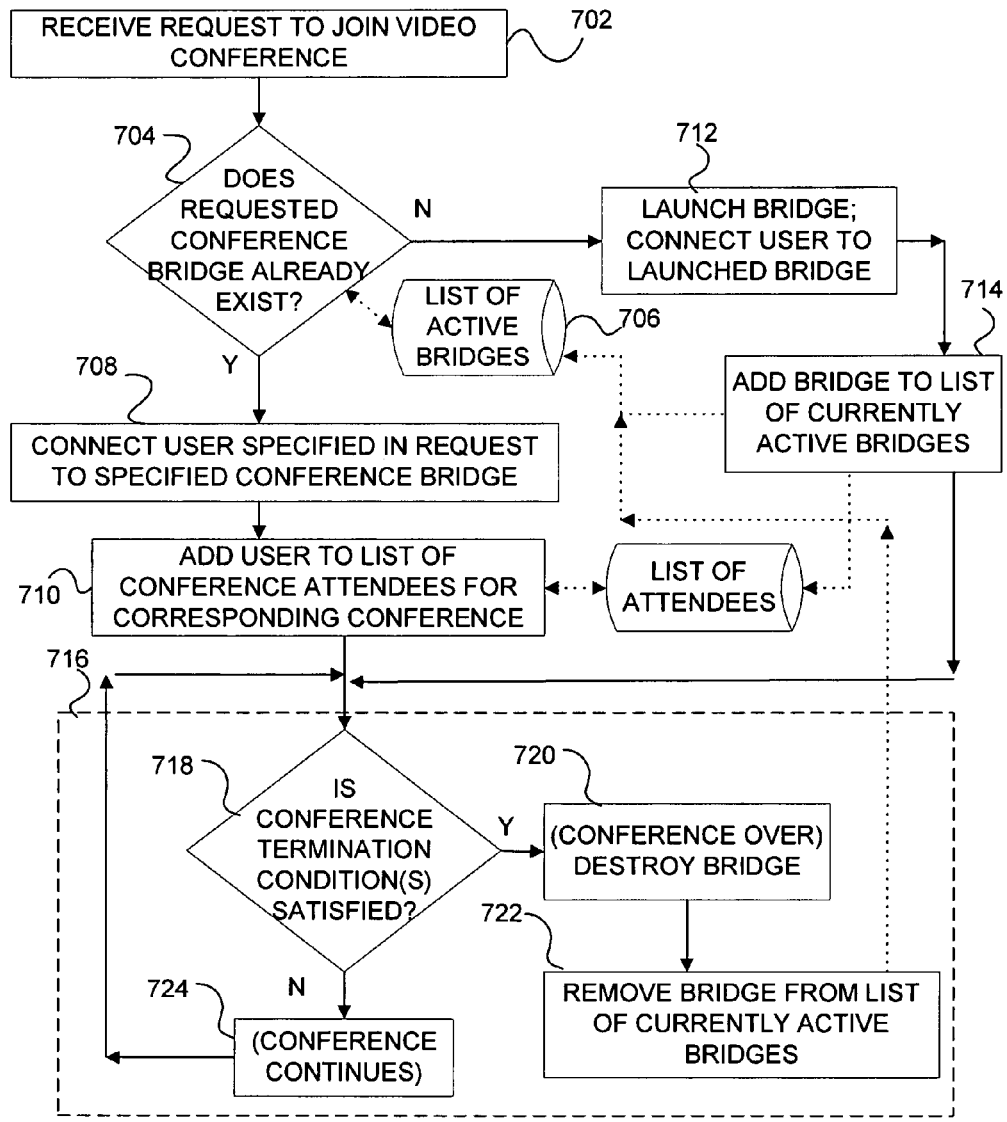
FIG. 9 is a flowchart illustrating example steps of an additional embodiment of the invention.

FIG. 9 illustrates one example set of steps of the invention for achieving this. The steps of FIG. 9 may be practiced, for example, by a bridge factory of the invention. A request to connect to a bridge is first received by the factory. Block 702. The request may have been communicated from a source through one or more filters. The factory may be located at the URL http://ig.insors.net/bridges, for example. The request may include, for example, a GET method with parameters that specify the sink location: http://ig.insors.net/bridges/106/audio/info. The source communicating it may identify this factory through consultation to a locator table. Because this URL is prefixed with http://ig.insors.net/bridges, its URL will be translated to /106/audio/info and it will be communicated to the bridge factory at http://ig.insors.net/bridges.

The request may include parameters that the bridge factory can use to configure or tailor the bridge to the requirements of the conference. These parameters may specify, for example, resources that must be allocated to support the conference, bandwidth that will be consumed during the conference, or the like. For example, if a video conference is being setup through a request communicated by a conference administrator, the parameters in the request may include the number of attendees, total number of video and audio streams, frame rates, conference start and end time, a list of authorized attendees, security parameters, recording specifications, data compression settings, codecs, and the like. The bridge factory can then create a bridge specifically to accommodate these requirements. This allows for efficient utilization of network resources and capacity in combination with good support of conference attendees since bridges can be created with no less or no more than exactly the required features and functionality.

By way of further example, if the parameters specify the total number of data streams to be communicated during a videoconference, an estimate of the bandwidth required to support the videoconference can be made. The bridge factory may then take additional steps to ensure that such bandwidth is available between it and each of the expected attendees at the videoconference. In addition or as an alternative, the bridge factory may specify a data compression setting depending on the amount of bandwidth to be communicated (e.g., large amount of data=high compression setting; small amount of data=small compression setting).

In one example embodiment, after reception of the request the bridge factory then determines whether the requested bridge(s) already exists or not. Block 704. This may be accomplished through consultation with a list of bridges, through a step of discovery, or through like steps. For example, when the bridge factory receives a request to launch or connect to a bridge that includes a "GET" method and parameters that identify http://ig.insors.net/bridges/106/audio/info, the factory may consult a memory (block 706) where the current status of existing bridges is stored to determine if either http://server1.insors.net/bridges/106/audio/info or http://server2.insors.net/bridges/106/audio/info exists.

The bridge factory may also update this list (block 706) through one or more steps of discovery. Example steps of discovery, include, but are not limited to, the factory confirming whether or not a particular bridge currently exists, or at any other time that it is privy to communications confirming the existence of a bridge. Other steps useful to identify existing bridges are also contemplated. One or both of the bridge factory and each of the bridges may also, for example, communicate a confirmation request and/or "ping" to the other(s) to determine their existence.

If the factory determines that the bridge exists, it executes the request by connecting the specified user to the specified bridge. Block 708. It may also then add the user to a data repository storing current conference attendees. Block 710. This data repository may be on a connected memory, and for convenience may be considered a list. The list 710 may be useful for various purposes, including reporting status of one or more users. Although not illustrated in FIG. 9, the list may be accessed by the bridge factory and or others from time to time.

If the factory determines that the bridge does not exist, it may create or launch the bridge, connect the user to that launched bridge, and add the attendee to the list of attendees. Block 712. As used herein, the terms "launch" and "create" when used in this context are intended to be broadly interpreted as meaning initiating or starting. For example, a step of "launching" or "creating" a conference bridge may include initiating a process such as an executable code that functions as a conference bridge by connecting a plurality of users to one another for sharing streaming data. After creating the bridge, the bridge factory may also add the newly launched bridge to the list of currently existing bridges. Block 714. The bridge factory may also communicate a confirmation of launching of the bridge to the source together with data useful to allow the source to access the bridge (which may include an identifier or a location for the bridge).

Additional steps of some embodiments of the invention include destroying the bridge after it is no longer needed. This avoids taxing the network with supporting bridges that are not currently required. Also, as with many applications, processes such as conference bridges that are left running for extended periods of time run the risk of encountering errors-they can become "buggy." Periodically resetting the process by terminating it and launching it when needed again can reduce the risk of errors interrupting operation. Also, a conference bridge may allocate one or more ports for use to support communication of multiple data streams between a plurality of users that are attending a data sharing event such as a video conference. Through invention embodiments that utilize a bridge factory to initiate and terminate a conference bridge only when it is needed, these ports are freed up to be used by others.

Within example embodiments of the invention, steps of destroying the bridge may be performed, for example, through determination of whether conference termination condition(s) have been satisfied. One set of example steps for ending a conference by taking down or destroying a conference bridge is illustrated within dashed line box 716 in FIG. 9. A decision is made as to whether a conference termination condition(s) has been satisfied. Block 718. Example conference termination or end conditions include, but are not limited to, expiration of a time period (e.g., conference has set duration of 1 hour from particular clock time or from time of launch, or absolute time has been reached—conference ends at 1 PM), disconnection from the bridge of the last conference attendee, disconnection of the conference moderator, and the like.

In the case of disconnection from the conference of the last attendee, the bridge or bridge factory may consult the list of attendees at each conference bridge that was updated in block 710. This list may be updated every time a request to disconnect is received from a particular attendee (source) by removing that attendee from the list.

In one example case, assume a video conference is desired to last for a specified time only (e.g., one hour), in which case the request to create the conference bridge includes a parameter specifying that length of time (e.g., CNFRNC_LNGTH=1:00). The bridge factory then creates the conference bridge with a predetermined "self-destruct" or end time corresponding to the desired time (e.g., END TIME=60:00). If the termination condition(s) has been satisfied, the bridge is taken down (Block 720), and the bridge is removed from the list of currently active bridge. Block 722. If the termination condition(s) has not been satisfied, the conference continues. Block 724. The example steps then return to block 718 to check the termination condition once again. In this manner, the example steps repeatedly loop through until the termination condition is satisfied.

The above example termination conditions can be thought of as "implicit" (whether requests are being directed at it, whether users are currently connected to it, whether "end time" has been exceeded, etc.). In other embodiments of the invention, conference end conditions may include explicit commands. For example, a DESTROY or END request may be communicated to the bridge from a source such as a conference attendee or administrator, the bridge factory, or some other entity.

Figure 10:
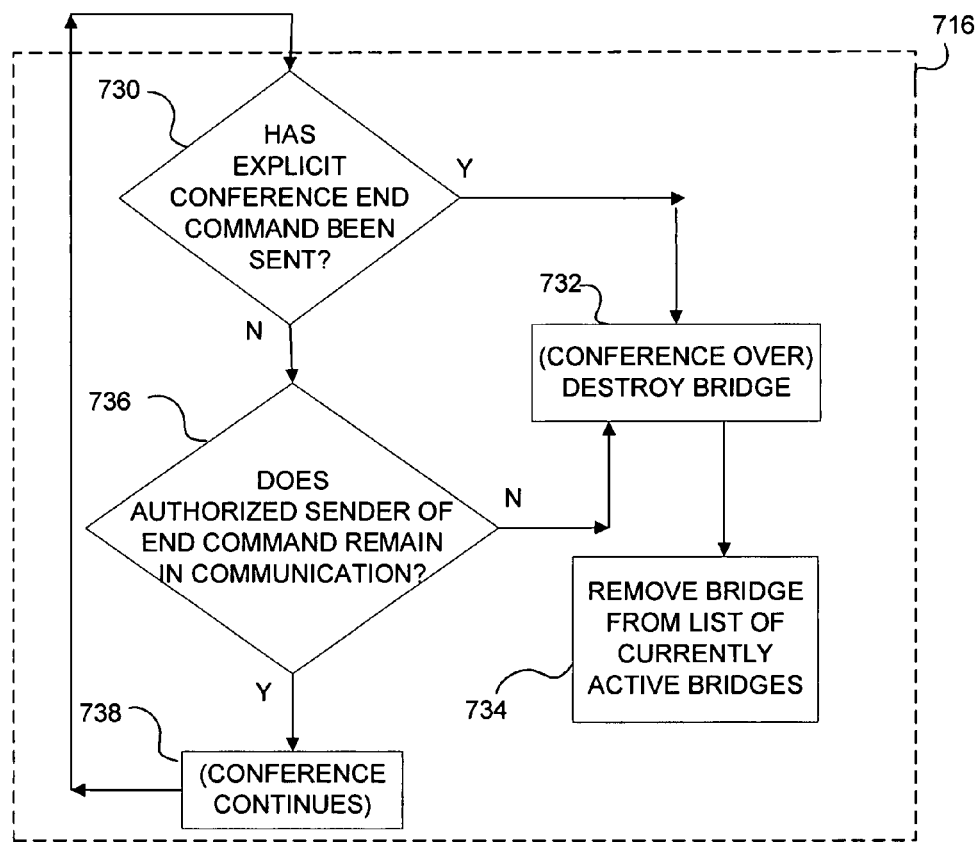
FIG. 10 is a flowchart illustrating example steps of an additional embodiment of the invention.

FIG. 10 illustrates an example set of steps of receiving an explicit conference end command. These example steps may be thought of as an alternative (or an addition) to the steps of dashed line box 716 from FIG. 9, and for this reason the example steps have been illustrated in FIG. 10 within dashed line box 716. The steps include determining whether an explicit conference end command has been received. Block 730. The explicit command may be received, for example, from a conference attendee (e.g., a source).

Some authorization may be required to communicate the explicit conditions. For example, a user or source may be required to have a "conference moderator" authorization to end a conference. Such authorization may be in the form of a particular network address, known to the factory as being authorized to communicate such a request, being communicated together with some authorization badge such as a digital certificate or ID, and the like. By way of further example, an initial request to create a conference may include parameters specifying which source(s) is authorized to destroy the bridge.

If the explicit command has been received, then the conference is ended by taking down the bridge—terminating the process that functions as a conference bridge by connecting users. Block 732. The bridge is then removed from the list of currently active bridges. Block 734.

In invention embodiments where an explicit command is used to destroy a bridge, with an example being the steps of FIG. 10, there is some risk that a user (source), factory or other entity that has the responsibility of sending the explicit destroy command will fail or otherwise lose communication with the bridge before it can issue the DESTROY or END command. If this occurs, the bridge may exist for longer than is necessary, or even indefinitely. To prevent this, some embodiments of the invention include steps of the entity such as the user that has the responsibility of issuing the DESTROY or END command to periodically confirm that it continues to desire that the bridge remain in operation or otherwise that it remains in communication.

This has been illustrated in the decision block 736 of FIG. 10. If the authorized user is no longer in communication, then the conference is ended when the bridge is taken down and the bridge is removed from the list of active bridges. Blocks 732-734. A variety of different steps can be practiced to determine whether the sender remains in communication with the bridge factory or bridge to be taken down to end the conference. This can be achieved, for example, through a step of one of the relevant authorized source (e.g., conference attendee or moderator) and the bridge communicating periodic confirmation or "ping" requests to the other. If the confirmation or ping goes unanswered, this indicates that something has caused the source with the responsibility of destroying it to lose communication with the bridge. Under these circumstances the example steps proceed to destroying the bridge and removing the bridge from the list of active bridges. Blocks 732-734. If the authorized sender remains in communication, then the conference continues (block 738) and the steps loop back to wait for the explicit takedown command.

Methods, systems and program products of the invention that utilize factories may find particular benefit and advantages when used with applications that involve multiple simultaneous versions being supported on the network. With this in mind, the example steps of FIGS. 9-10 may be further illustrated through consideration of the schematic of FIG. 11. A plurality of users A-E are communicating with the network 750 to conduct a plurality of videoconferences or other data sharing events. Each of the users may include a plurality of individual sources. That is, each of users A-F of FIG. 11 may represent multiple individual sources, with each source being a conference room such as that schematically illustrated in FIGS. 2, 3 or the like. Each user may represent, for example, a campus, a corporation or other group of individual sources.

By way of particular example, each of users A-F may be different corporations each having 100 or more individual conference rooms (each of which can be considered a source) that are engaged in different data sharing events on the network 750. Some of the individual conference rooms at one corporation (e.g., user A) may be attending data sharing events together with conference rooms from a second corporation (e.g., user B), while other corporations (e.g., user C) may be limited to only having internal conferences.

By way of additional example, the network 750 may be useful to support an on-demand data sharing event service where individual users can connect as and when desired to participate in a data sharing event. Some or all of users A-F in this case may be individual consumers participating from a home computer, small businesses, traveling salesmen with a laptop, or the like. Many other example applications are possible. Also, it will be appreciated that the network 750 has been shown in a simplified schematic only, with the intention that such a representation aids understanding of an invention embodiment. Actual networks in practice may be far more complex and include significant additional features and elements which are unnecessary for purposes of illustrating the present invention embodiment.

Figure 11:
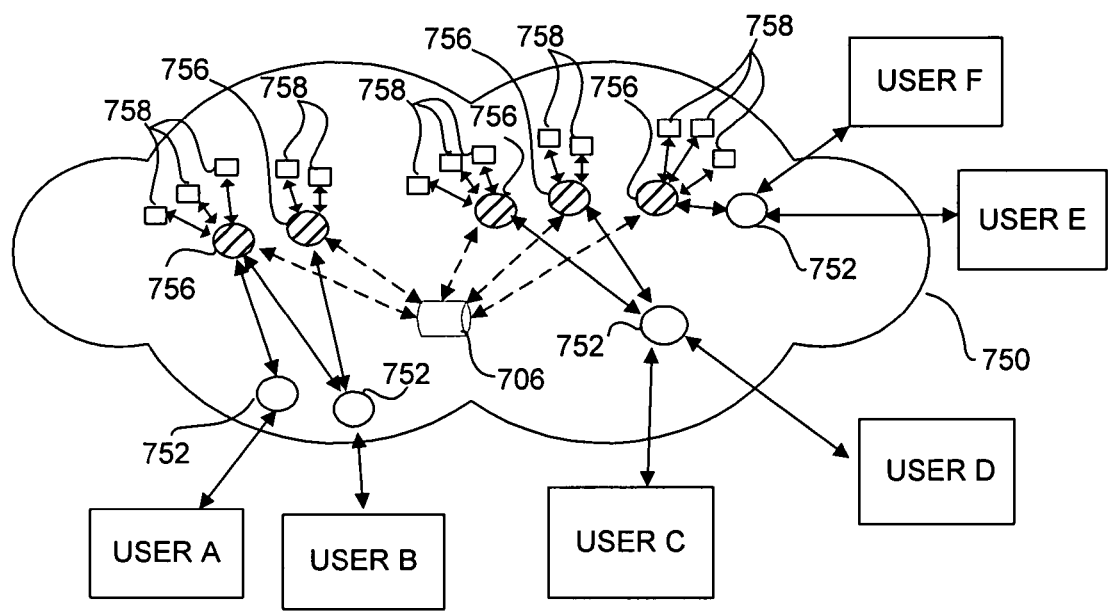
FIG. 11 is a schematic diagram useful to illustrate practice of an example embodiment of the invention.

The configuration of FIG. 11 may therefore be supporting a plurality that can number into the dozens, hundreds, thousands or more of simultaneous individual data sharing events. It is noted that as used herein, the term simultaneous when used in this context is not intended to be limited to having the same start time, duration, and end time, but instead includes any data sharing events which may overlap in time. For example, a first videoconference running from 1 PM to 2 PM may be considered "simultaneous" with a second that runs from 1:30 PM to 3 PM.

The network 750 includes a distributed configuration as described above, with users communicating a request to initiate a data sharing event such as a videoconference to one of the filters 752. The source communicating the request may practice steps as outlined herein above, including use of a locator table and a sink table to identify a particular filter 752. The request may include a method and parameters that together provide sufficient specifications to initiate a videoconference bridge. An example request might include the method "Launch.Bridge," and parameters that specify a network location for a user, number of expected attendees, security access code, expected duration time, and the like.

The filter 752 may likewise practice steps as discussed herein above to forward the request, including use of a forwarding table. After doing so, the filter 752 forwards the request to a bridge factory 756 (which has been shown using dashed shading for clarity). It will be appreciate that although the simplified schematic of FIG. 11 shows the filter 752 communicating directly with the factory 756, in practice the request may pass through any number of filters before reaching the factory 756. In one invention embodiment, after receiving the request the bridge factory 756 practices steps generally consistent with those of FIG. 9 to launch a conference bridge 758.

FIG. 11 illustrates multiple bridge factories 756 (which have been colored with dashed lines for clarity in FIG. 11), each of which has launched multiple conference bridges 758. The bridge factories 756 communicate with the data repository 706 (consistent with the list 706 of FIG. 9). When a bridge factory subsequently receives a request to join a conference, it consults with the list 706 to determine whether or not a conference already exists, and if so, connects the requesting user to the existing conference. It is noted that although the schematic of FIG. 10 illustrates the factories as being connected only to the filters 752 and conference bridges 758, other connections may exist to establish interconnectivity between factories 752, filters 756, and conference bridges 758. Indeed, it will be appreciated that in the distributed configuration described herein above, each of the users A-F, each of the filters 756, and conference bridges 758, as well as other nodes (sinks, filters and resources) are interconnected and may communicate with one another.

The filters 752, bridge factories 756, and conference bridges 758 may reside on one or more computers. Additionally, sub-groups of filters 752, bridge factories 756, and conference bridges 758 can be distributed across different computers as may be useful, beneficial and practical. For example, a bridge factory 756 may reside on the same computer as all of the conference bridges 758 that it generates, or, one or more of the bridges 758 that it has launched may be on different computers.

Figure 12:
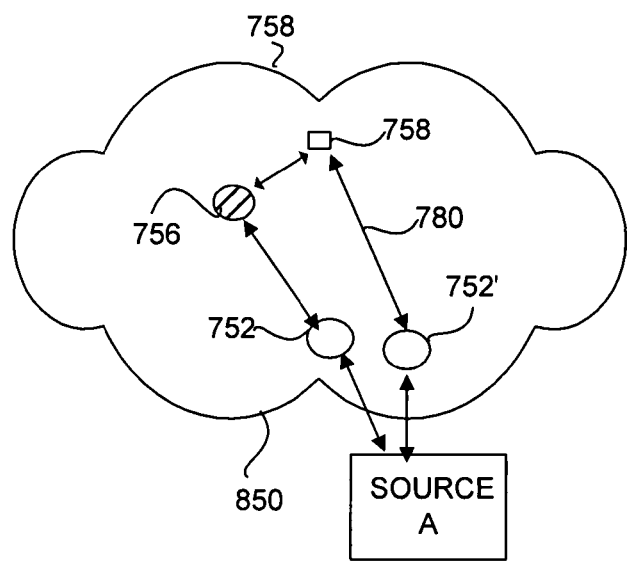
FIG. 12 is a schematic diagram useful to illustrate practice of an example embodiment of the invention.

After the conference bridge 758 has been launched, the source may communicate streaming data with it without passing through the bridge factory 756. This has been shown schematically in FIG. 12, which shows a path 780 for streaming data that avoids bridge factory 756. These streaming communications may likewise pass through one or more filters 752' that are different from the filter 752 used to forward the request to launch the conference bridge. During the videoconference or other data sharing event, the source may also remain in communication with the bridge 756, however, for purposes of terminating the conference or other purposes. Referencing FIG. 10, for example, communication between the source and the bridge may be periodically carried out during the duration of a vide conference to perform the steps of Blocks 730-738. At the completion of the conference, the conference bridge 758 (FIGS. 11-12) is terminated.

It will be appreciated that factories of the invention will have benefits and advantages when used with applications other than launching and terminating conference bridges. Those knowledgeable in the art will appreciate that factories of the invention can be practiced with many other applications related to data sharing events, including by way of example and not limitation, recorders, codecs, translators, RTSP sinks, HTTP sinks, XML sinks, database sinks, and the like. Accordingly, it will be understood that discussion and illustration made herein that reference bridges illustrates only one example embodiment of the invention, and that this discussion and illustration likewise applies to applications in addition to bridges.

One particular example includes a videoconference in which an attendee wished to participate using only voice communications. In this instance, a gateway or translator application (e.g., a node such as a sink or resource) may be required. The translator application may be useful, for example, to translate H.323 protocol streaming voice data communications to a different protocol supported by the videoconference attendees. Rather than having a translator resource running for an extended period the entirety of which it is not being used, a translator factory may be utilized to launch the translator application only when needed and to destroy it when no longer needed.

Figure 13:
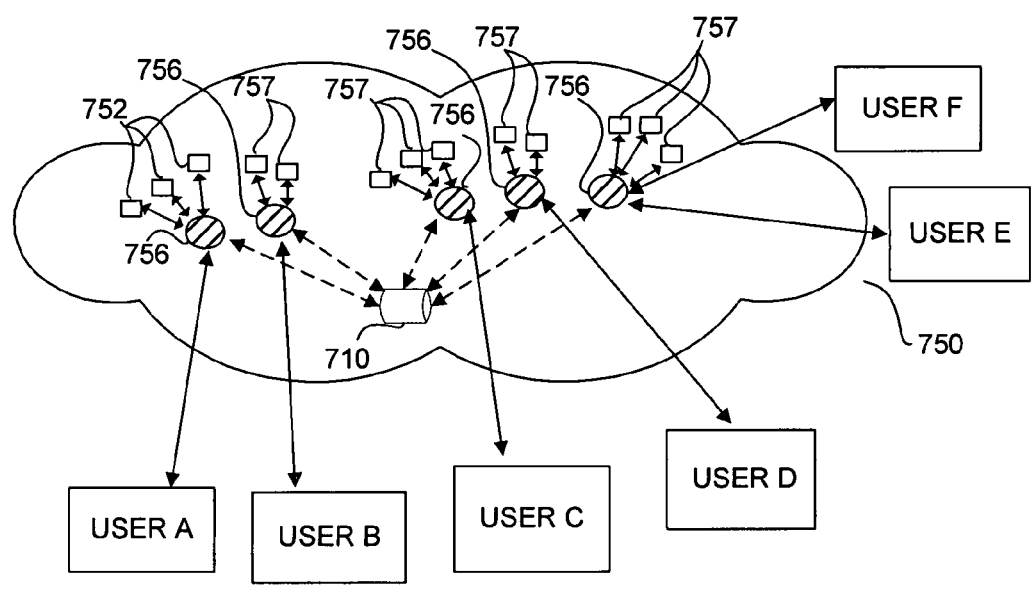
FIG. 13 is a schematic diagram useful to illustrate practice of an example embodiment of the invention.

It will additionally be appreciated that embodiments of the invention that utilize factories are not limited to the distributed configuration of other invention embodiments described above. Other invention embodiments that utilize factories may be practiced using a more traditional client-server configuration, for instance, while still achieving many of the benefits and advantages as discussed herein above. FIG. 13 illustrates one such configuration, in which clients such as users A-E communicate directly with a server on which a factory 756 is running and operating as described herein above to control the launching and terminating of applications 758 as required by the client. It will likewise be appreciated that discussion and illustration made herein above regarding factories of the invention may be applicable regardless of whether the factories are operating in a distributed network configuration or another configuration, with a more traditional client-server configuration being one example.

Although particular examples of factories, methods for using the factories, and related program products have been made hereinabove, such disclosure has been made to illustrate example embodiments of the invention only and should not limit the scope of the claims attached hereto. Those knowledgeable in the art will appreciate that the advantages and benefits of the invention can likewise be achieved through slight alterations and variations of the examples discussed herein. Many equivalents are known.

Load Balancing:

In some methods of the invention, it is desirable to perform communications over a network through steps that are useful to avoid latency. One set of steps for doing so are referred to as "load balancing" steps and generally include utilizing different communications paths, sinks, resources, and other objects to avoid congestion and latency.

Although these steps of the invention may be practiced with a variety of different applications, one invention embodiment can be further illustrated through an example directed to load balancing for conference bridges. Assume a method of the invention is being used to support multiple simultaneous video conferences over a network. To avoid congestion, steps of some invention embodiments include distributing conference bridges across different computers. In one such example embodiment, instead of communicating requests to launch/join bridges directly to a bridge factory, the requests are communicated to a load balancing filter or other node that performs steps of load balancing with respect to deploying bridges.

For convenience, the load balancing filter or node will be referred to as a "load balancer." It will be appreciated that this is a term chosen for convenience only and should not be interpreted to limit the present example embodiment. Other terms could easily be used to refer to this functional element, with an example being a resource allocator, a distribution controller, and the like. A load balancer may be, for example, a resource, a filter, a bridge factory, other node, or the like. The load balancer performs steps useful to distribute bridges to reduce the risk of congestion at any particular bridge.

In some invention embodiments discussed herein above, a conference may be initiated by a user communicating a request to launch a conference bridge to a bridge factory resource. The bridge factory when executing the request might launch a conference bridge which the user (and other conference attendees) would then be connected to. In invention embodiments in which load balancing nodes are used, a step of routing the request through the load balancer is performed.

Figure 14:
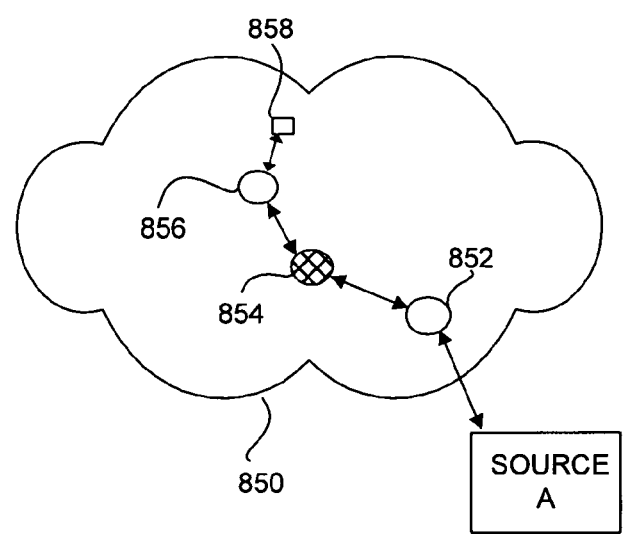
FIG. 14 is a schematic diagram useful to illustrate practice of an example embodiment of the invention.

The schematic of FIG. 14 is useful to illustrate such an invention embodiment. Assume that a user such as source A wishes to initiate a data sharing event such as a videoconference on the network 850. To do so, the source A communicates a request to initiate a conference to a filter 852. This communication may include steps as illustrated above, including, for example, the source D using one or more of a locator table and a sink table to identify a location for the filter 852. The filter 852 likewise may use a sink table to identify the load balancer 854 to which it forwards the request. Upon reception, the load balancer 854 identifies a bridge factory 856 to communicate the request to, which in turn launches a conference bridge 858. The source D will then be connected to the conference bridge 858, as will other conference attendees who subsequently communicate requests to join the conference.

Figure 15:
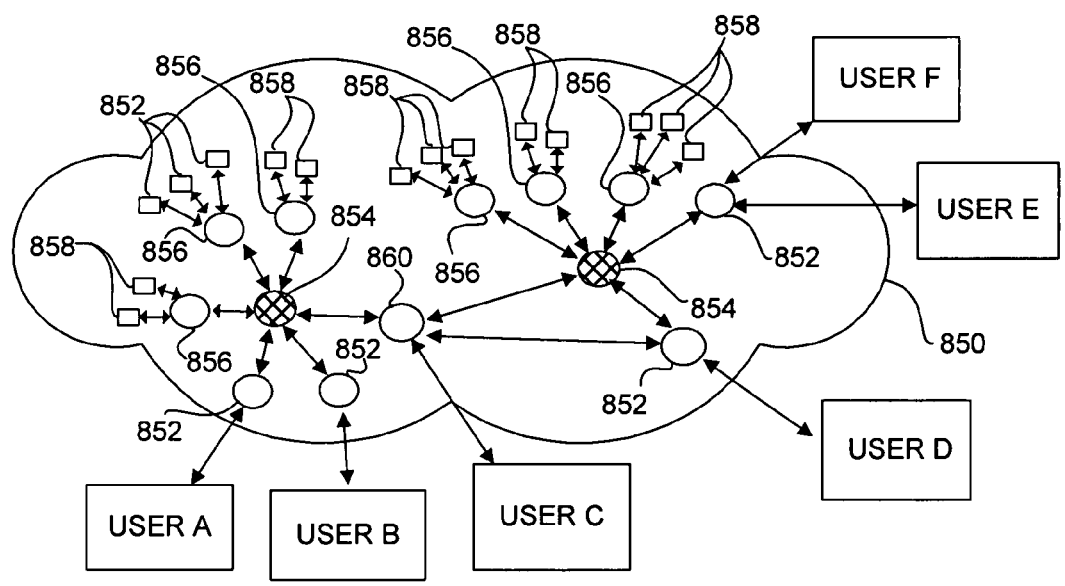
FIG. 15 is a schematic diagram useful to illustrate practice of an example embodiment of the invention.

The schematic of FIG. 15 will be useful to further illustrate the benefits and advantages of an invention embodiment that expands on the configuration of FIG. 14 to support a plurality of users. In the schematic of FIG. 15, a plurality of users are in communication with the network 850. As noted above with reference to FIG. 11, each of the users may include a plurality of individual sources. That is, each of user A-F may represent multiple individual sources, and may represent, for example, a campus, a corporation or other group of individual sources. By way of particular example, each of users A-F may be different corporations each having 100 or more individual conference rooms (each of which can be considered a source) that are engaged in different data sharing events on the network 850. Some of the individual conference rooms at one corporation (e.g., user A) may be attending data sharing events together with conference rooms from a second corporation (e.g., user B), while other corporations (e.g., user C) may be limited to only having internal conferences.

By way of additional example, the network 850 may support an on-demand data sharing event service where individual users can connect as and when desired to participate in a data sharing event. Some or all of users A-F in this case may be individual consumers participating from a home computer, small businesses, traveling salesmen with a laptop, or the like. Many other example applications are possible. Also, it will be appreciated that although only users A-F have been illustrated together with only two load balancers 854, several bridge factories 856 and conference bridges 858, the numbers and scale shown are not intended to limit the scope of the invention. Indeed, it will be appreciated that in many instances the benefits and advantages of an invention embodiment as illustrated by FIG. 14 increase as the number of users and the scale of the application increase. The configuration of FIG. 14 may therefore be supporting a number of simultaneous data sharing events that numbers into the dozens, hundreds, thousands or more.

On the network 850 of FIG. 14, the filters 852, load balancers 854, bridge factories 856, and conference bridges 858 may reside on one or more computers. Additionally, subgroups of filters 852, load balancers 854, bridge factories 856, and conference bridges 858 can be distributed across different computers as may be useful, beneficial and practical. For example, bridge factory 856 may reside on the same computer as all of the conference bridges 858 that it generates. Alternatively, some or all of the conference bridges 858 may be on different computer(s) from the bridge factory 856 that generates them. Also, the filters 852 may be located on the same, or on a different, computer than the load balancer 854.

In large scale applications a plurality of computers will likely be utilized to distribute the filters 852, load balancers 854, bridge factories 856 and conference bridges 858. This distributed configuration may be beneficial to achieve redundancy useful to avoid service interruptions, to avoid congestion, and for similar reasons. In one particular configuration, each bridge factory 856 and the conference bridges that it deploys all reside on a single computer, while other nodes, including filters 852 and load balancers 854 are distributed across a plurality of other computers. Finally, some configurations are possible in which all of the filters 852, load balancers 854, bridge factories 856 and conference bridges 858 reside on a single computer.

Through methods, program products and systems illustrated through the example configuration of FIG. 15, each individual request to initiate a data sharing event such as a videoconference is communicated to a filter 852 which uses a sink table to identify a load balancer 854 to communicate the request to. One or more load balancers may be present on the network, with at least two useful to provide a redundancy. In the example configuration of FIG. 15, a filter 860 links two load balancers 854 for possible re-routing or forwarding of requests should one balancer be permanently or temporarily unavailable. Also, it will be appreciated that the schematic of FIG. 15 has been simplified for illustration purposes, and that in practice a significantly larger number of filters 852 as well as interconnectivity between filters may exist.

Figure 16:
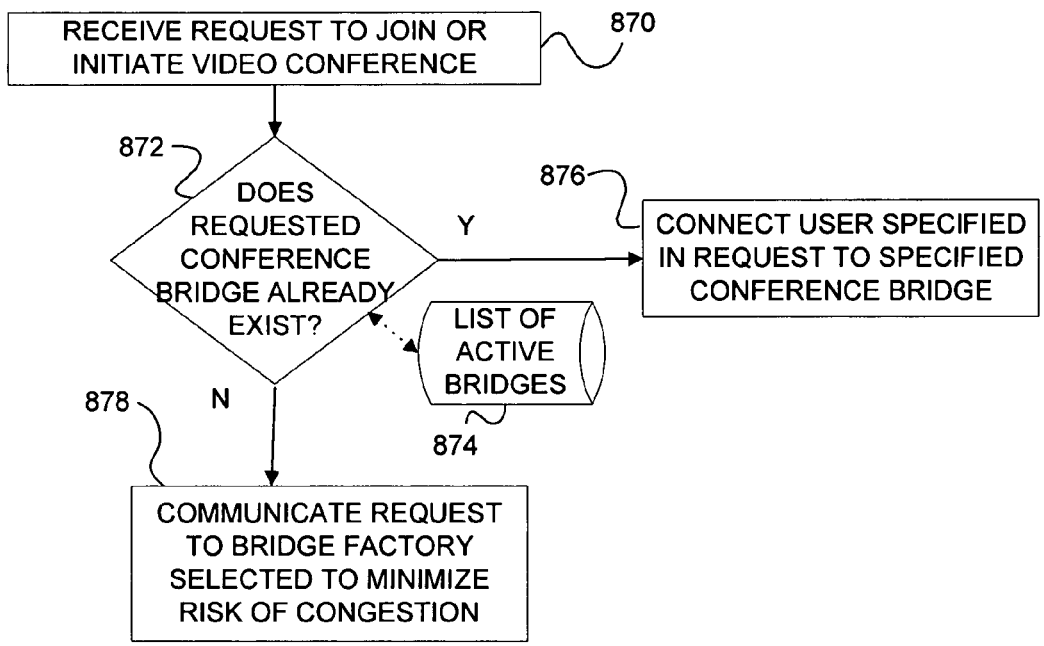
FIG. 16 is a flowchart illustrating example steps of an additional embodiment of the invention.

FIG. 16 illustrates one set of example steps that may be practiced by one of the load balancers 854 of FIGS. 14-15 upon receiving a request to initiate a video conference. The load balancer 854 first receives a request to initiate a videoconference. Block 870. The request may include a method such as "GET" or "CONNECT" together with parameters that specify a particular conference bridge(s) or bridge factory(s), which may be, for example, http://server1.insors.net/bridges and http://server2.insors.net/bridges. The load balancer 854 next determines if the specified bridge(s) or factory(s) currently exists. Block 872. This may be accomplished through consultation with a list of bridges, through a step of discovery, or through like steps. Block 82.

In the example of FIG. 16 a memory 874 has been illustrated as including a list of currently active bridges. When the load balancer 854 receives a request to launch or connect to a bridge such as a "GET http://ig.insors.net/bridges/106/audio/info," it can consult this memory 874 where the current status of existing bridges is stored to determine if either http://server1.insors.net/bridges/106/audio/info or http://server2.insors.net/bridges/106/audio/info exists. The load balancer may also update this list once it confirms whether or not a particular bridge currently exists, or at any other time that it is privy to communications confirming the existence of a bridge.

Other steps useful to identify existing bridges are also contemplated. The load balancer may also, for example, communicate a request to each bridge or bridge factory to determine their existence, and/or to query those bridges and factories for lists of all other bridges/factories known to them. The load balancer may also "ping" each of the factories with a communication to determine if they exist. If the factories are not configured to automatically create bridges in response to a request, for example, the load balancer may forward the request to join a conference or create a bridge to each bridge and check the response. An error response will indicate that the bridge does not exist, and if the bridge does exist it will not respond to the request by deploying a bridge since it is not configured to do so.

If the bridge(s) already exists on one of the computers, the load balancer forwards/redirects the request to the appropriate URL whereby the user (source) will be connected to the bridge(s). Block 876. If, on the other hand, the bridge does not exist the load balancer 854 can performs steps of creating it at a location selected to minimize risk of congestion. Block. 878. Generally, these steps may be useful to select a location on the network to place the conference bridge where the least amount of congestion will be expected. There are a variety of different steps that will be useful to carry this out.

For example, when a plurality or even all requests to launch conference bridges are sent through a single load balancer 854, that node can distribute requests to result in a relatively equal distribution of conference bridges. Distribution can be practiced through any number of particular steps, including random selection of network locations or bridge factories (e.g., randomly select from all available bridge factories to send a given request to), round-robin selection of network locations or bridge factories (e.g., if three factories are available, first, fourth and seventh requests can sent to a first bridge factory; second, fifth, and eighth requests to second factory; and third, sixth and eighth requests to a third factory), and the like. In a random, round robin, or like distribution method, the load balancer 854 may record the bridge factory 856 or other network location that a particular request is forwarded to for future reference.

Other example steps of forwarding requests to avoid congestion include the load balancer 854 determining one or more of the actual CPU load, latency, or other parameters indicative of congestion that currently exist at one or more of the available bridge factories or other potential network locations to select the factory or location with the best current availability. This can be accomplished through one or more of a number of steps, including measuring latency, sending a formal query requesting current delay or CPU usage to a bridge factory or other network location. The load balancer 854 may also perform a step of using a memory where most recent latencies, CPU usage, or the like are stored.

The load balancer 854 may also perform steps of considering quality of service parameters that are included with requests it receives and ensuring that these parameters are satisfied. By way of example, the request may include a parameter that specifies some level of quality of service, such as, for example, a TTL value. The load balancer 854 may perform steps of querying available bridge factories or other network locations to identify which can satisfy the requested quality of service level.

Following the steps performed by the load balancer 854 of identifying which bridge factory 856 or other network location will provide the lowest risk of unacceptable congestion, the load balancer 854 forwards or redirects the request to the selected factory 856 or location. As one alternative, the load balancer 854 can explicitly create a conference bridge 858 by sending a CREATE request to an appropriate factory 856.

It will be noted that although the schematics of FIGS. 14-15 include bridge factories 856 that deploy conference bridges, other configurations may operate without bridge factories 856 and instead may include load balancers 854 communicating directly with conference bridges 858 or other network locations. In one such example configuration, for instance, the load balancers may communicate with conference bridges 858 that are statically deployed.

Figure 17:
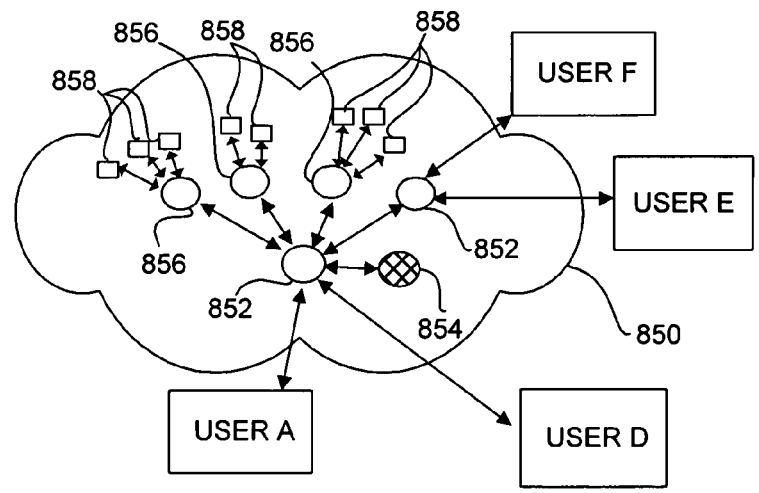
FIG. 17 is a schematic diagram useful to illustrate practice of an example embodiment of the invention.

In the configuration of FIG. 15, the load balancer 854 has generally functioned as a sink/filter. In addition to being configured as a sink/filter, embodiments of the invention may include use of a load balancing resource. For example, a resource could be distributed on the network that functioned to perform steps of load balancing as described above. This has been schematically illustrated in FIG. 17. The load balancer in this example embodiment may provide redirect information or otherwise direct the flow of the request without actually forwarding the request. The load balancer 854 is consulted by a filter 852 as to where to forward a request, and the load balancer 854 communicates a location to the filter for forwarding, which may be, for example, a bridge factory 856 selected to result in the least amount of congestion. Although not illustrated in FIG. 17, the load balancer 854 may be in communication with the available bridge factories 856 in order to determine their availability, level of congestion and other factors. In such a configuration, the load balancer 854 may be thought of as a sort of traffic controller that directs, but does not actually handle, requests for launching bridges being communicated over the network 850.

An example load balancing resource is a set of software instructions referred to as "LoadBalancer;" a filter that forwards requests to a plurality of other filters/sinks in such a way as to balance the consumption of computing resources across different computers.

Also, in the example invention embodiments discussed in this load balancer section and illustrated in the FIGS. 14-17, load balancers have been discussed with reference to bridge factories and conference bridges in particular. It will be appreciated, however, that use of load balancers within the present invention are not limited to these applications. Those knowledgeable in the art will appreciate that load balancers will be useful with other applications. Examples of other applications that will find benefit of practice together with load balancers include, but are not limited to, other applications that are subject to congestion. Particular examples include recorders, translators, other resources, and the like. It will be appreciated that the general configurations of FIGS. 14-17 can apply to such other applications as well.

The above examples and schematics of FIGS. 14-17 have been illustrated in a environment that utilizes sources, sinks and filters to achieve a distributed configuration for supporting a data sharing event. Other load balancer invention embodiments, however, could be practiced in other configurations. For example, a traditional client-server configuration could achieve benefit through use of a load balancer of the invention.

Quality of Service

A client or source often doesn't have information available to it sufficient to describe the condition of servers or the network in general. As a result, when a source or client requests a resource to perform a method, it may be difficult for the client to predict the time required for execution of a request. While in some cases this isn't important, in other cases it can be. Sometimes, for example, it is desirable for a source or other client software to be able to guarantee that certain methods will be executed within a certain amount of time. These guarantees of execution within a required time are sometimes referred to as "quality of service" or "QoS" (note that this term is used for convenience only and is not intended to limit the scope of the invention). Some embodiments of the present invention include steps useful for measuring and ensuring such requirements.

In some systems, program products and methods of the invention, quality of service variables may be expressed as latency. This may be expressed, for example, at the application level. The overall latency of the entire system is often of primary relevance from a client or source perspective. This can be thought of, for example, as how long it takes (i.e., the delay) to get a response after communicating a request. It can be useful to further subdivide the overall latency into two primary components: network latency and server latency. Network latency can be thought of as the delay in communication over the network and server latency as how long it takes the server or sink/resource to execute the request once received. It also can be useful to further break down the network latency into two primary components: upstream latency and downstream latency.

Some methods of the invention include steps of measuring overall latency as the time between sending a request and receiving a response. Network latency may also be measured as the time between sending a request and receiving the first message back from the server or sink/resource (such as a continuation or response), since the server or sink/resource typically communicates something back immediately after receiving a request.

Server latency can be estimated as the time between when the server or sink receives a request and when the method in the request is executed. This can be estimated, for example, as the time elapsed between when the server or sink sends a first continuation and when it sends a final response (if just a response is sent and no continuation, then the server latency can be estimated as zero). Relevant time values may be obtained, for example, from time stamps in message headers, by consultation to a clock, or through other steps.

The upstream and downstream network latency can be estimated as one half of the total network latency, or if the clocks on the client and server are synchronized (using any of several known methods, including Network Time Protocol as one possible example) then the upstream latency can be estimated as the difference between the time the request was sent and the value of the "time" header on the first message sent back from the server. Similarly, the downstream latency can be estimated as the difference between the value of the "time" header on the first message sent back from the server and the time at which the response is received by the client. Other steps of estimating time are also contemplated.

In some methods, systems and program products of the invention, each source/filter uses the above methods to keep track of the QoS of the system from that source/filter's perspective. This is useful for diagnostic purposes, and for sources and filters to be able to guarantee a certain QoS. For example, a source may include a value in the header, payload, or otherwise included with requests that specifies a maximum time that can pass before the request is executed. In some invention embodiments this value is referred to for convenience as the "time to live" or "TTL" (i.e., the "time to live" for the request). Put another way, if the TTL has expired the request is no longer to be executed. If a particular request should be executed within 3.4 seconds, for instance, a TTL of 3.4 sec may be included in a request header. If the network is synchronized, this can be an actual clock time (e.g., if current time is 12:00:00.00, TTL=12:00:03.40). In another example step useful when the network is not synchronized, the TTL may specify an amount of time as opposed to a clock time (e.g., TTL=3.4 seconds).

In some example invention embodiments, steps are performed that utilize the TTL to make forwarding, routing and other decisions. For example, if an actual clock time (relative or absolute, and referred to herein as a "clock time") is specified as the TTL, each filter and the final sink that receives the request can compare the TTL to the current clock time, and only process the request (e.g., forward it, issue a redirect, or execute it) if the TTL has not been reached. If the actual time has been reached or exceeded, an error message is returned.

An example set of such steps are illustrated in the flowchart of FIG. 18. When a request is received by a sink or filter, the TTL specified in its header, payload or elsewhere is read. Block 502. The TTL may be, for example, 3:09:35. The TTL is then compared to the actual clock time. Block 504. A decision is made depending on whether the TTL has expired-whether it exceeds the clock time or not. Block 506. If so, an error message (such as, for example, "ERROR: REQUEST TIMED OUT") is returned (Block 508) to the originating node; if not the request is processed (Block 510). Processing may include executing the method in the request (if the actor is a sink/resource) or forwarding the request (if the actor is a filter).

If the TTL specifies an amount or period of time (referred to herein as an "elapsed time") as opposed to a clock time (e.g., 3.4 sec is a period or amount of time, 12:00:03.04 is a clock time), the source initiating the request as well as each intermediate filter modifies the TTL value by subtracting the current upstream network latency from that period of time. For example, if a first filter determines that latency upstream to a second filter is 1 sec, it subtracts 1 sec from the TTL before forwarding to the second filter. Upon reception, the second filter then has an accurate TTL figure for the amount of time remaining to process the request. If the TTL is negative for any filter (e.g., if filter 2 receives a request with a TTL of 0.8 sec and it determines that the upstream latency is 1 sec), it will determine that the request has expired and communicate an error response back to the source. Otherwise, the request is forwarded to the next filter.

FIG. 19 illustrates a set of example steps for use when the TTL specifies a period of time (if, for example, the network is not synchronized). When the request is received by the sink or filter, its specified TTL is read from the header, payload or elsewhere. Block 602. For reference purposes in this example, this TTL is referred to as $TTL_{OLD}$. If the receiver is a filter, the destination sink or filter is determined, for example through steps described above, which may include consultation with one or more forwarding or sink tables. Block 604. The current downstream latency is then determined between the filter and that destination. Block 606. This can be accomplished, for example, through consultation with a table where estimates of current latency are stored. For reference herein this current latency estimate is referred to as LTNCY. A "new" $TTL_{NEW}$ is then calculated:

$$TTL_{NEW} = TTL_{OLD} - LTNCY$$

which can be thought of as the "remaining" TTL when the request reaches the destination sink or filter. Block 608.

It is next determined whether $TTL_{NEW}$ is greater than 0. Block 610. As discussed above, this can be thought of as a determination of whether there will be time left in the request's "life" when the request reaches the destination sink or filter. Put another way, this is a determination of whether or not the TTL has expired. If the TTL<0 (i.e., it has expired), an error message is returned to the node the request was received from and the request is not forwarded. Block 612. If the TTL>0 (i.e., it has not expired), the request is forwarded. Block 614.

When the request reaches the final sink, the sink can prioritize processing based on the value of the TTL headers of the requests it has received. For example, if the sink has received two requests, a first with a TTL of 0.4 sec and a second with a TTL of 0.7 sec, it can choose to execute the first before the second since there is less time remaining for the first to "live." In addition, if a TTL expires before the sink can finish processing the request, the sink can immediately abort the request, return an error response, and move on to other tasks to avoid unnecessary use of resources.

Filters can also practice steps of prioritizing so that requests with smaller TTL's (i.e., less time remaining in their TTL) are forwarded before other requests that have larger TTL's (i.e., longer amount of time remaining in their TTL). For example, assume a second request with a low TTL is received later in time than a first request with a high TTL. The receiving filter may forward the later received second filter before forwarding the first request received earlier in time. Or, the receiving filter may establish a queue with multiple received requests ranked according to their TTL's, with execution of those requests then determined by their ranking. Filters can also perform steps of load balancing or other forms of request routing by taking into consideration requests' TTL's and known (or estimated) latencies across potential forwarding routes. The filter can avoid congested routes (high latency) for requests with low TTL's, for instance. Other queueing schemes and methods using TTL's and knowledge of latency will be apparent to those knowledgeable in the art. Practice of these steps has been shown to lead to unexpected results in that overall network latency was significantly decreased, efficiency increased, and overall user satisfaction (particularly in a large scale video conference with multiple users) was significantly increased.

If more than one suitable sink is available, a filter can also select a particular sink to avoid congestion. If, for example, each of sinks 1-3 are suitable for forwarding a particular request to, the filter can perform a step of estimating which of those sinks is most likely to provide quick processing of the request. This determination can be made through a variety of suitable steps, with one example being estimating latency of each of the sinks 1-3, and/or forwarding each successive request to a different of the sinks 1-3 to avoid the risk of overloading any particular sink with multiple requests.

Some embodiments of the invention also include steps of filters making use of a requests' TTL to make other forwarding decisions. If a filter receives a request with a relatively high TTL (i.e., relatively large amount of time to execute), for example, it may forward to any available sink. If the TTL is relatively small (i.e., relatively small amount of time to execute), on the other hand, the filter can perform steps of identifying the most suitable sink for forwarding. In this manner, a filter may use a request's TTL and knowledge of latency to make routing decisions.

In another example step, when a filter has multiple similar requests to forward it can select which sink to forward each of the particular requests to based on their TTL's and the latency of the available filters. A request with a low TTL may be sent to a low latency sink and no other requests sent to that filter. Several requests with higher TTL's, on the other hand, may be sent to one or more second filters with higher latencies.

It is noted that achieving the present inventive embodiments represented a highly challenging and very difficult task, particularly on a scale that involves relatively large numbers (e.g., 10's) of users simultaneously communicating real time audio and video data to one another. On these scales such steps as sources identifying sinks, communicating requests, and processing requests which are performed by multiple nodes at the same time are difficult. Additionally calculating, assigning and exploiting TTL values in the manner described herein proved to be exceedingly difficult and uniquely challenging. The present invention represents the overcoming of these challenges and difficulties.

In still other embodiments of the invention, a source can reserve a certain QoS by sending a request, which can be referred to as a "RESERVE" request, which specifies the maximum latency desired and the time frame during which that is desired. The receiving sink returns a success response only if it is able to guarantee that level of QoS during that time frame. By way of example, a source may send a "reserve" request to a sink that includes parameters of the maximum time limit allowable, the type of request to be executed during that time, and the expected time of communication of that request. Upon reception of the reserve request, the receiving sink ensures that it can execute the specified request in the allotted time, and then reserves the necessary resource. The step of reserving may include, for example, "blocking out" the requested resource at the expected time of reception. Such blocking out will have the effect of the resource denying or putting off execution of other requests that are received that might otherwise delay execution of the method that is subject to the reserve request.

The above example embodiments of QoS are believed to be particularly useful when practiced in methods, systems and program products of the invention related to real-time data sharing events such as video conferences. The requests communicated, in these invention embodiments may comprise, for example, requests to establish communication channels or routes, requests to record video data, requests to increase audio volume, and the like. These invention embodiments may be of the greatest value when multiple users are communicating large amounts of video and audio data over the network to one another in real time. Delays or loss of such data can lead to low levels of user satisfaction and other problems.

Embodiments of the above described methods, systems and program products (with those of FIGS. 18 and 19 being two example) for guaranteeing a desired level of QoS have been discovered to offer unexpected results in videoconference environments that include multiple users communicating real time audio and video data to one another. Overall system communications in a videoconference environment have been greatly stabilized and user perception is significantly improved. Because user perception is greatly affected based on synchronization of audio with video, the improvements over the prior art achieved through embodiments of the invention have led to a significant and unexpected increase in user perception and satisfaction.

It will be appreciated that discussion herein of various embodiments of methods and program products of the invention are illustrative only, and that many variations are possible within the scope of the invention as claimed herein below. The sequence of steps, for example, could easily be altered. Also, some steps may be omitted and others substituted. Finally, equivalents to the steps recited will be apparent to those knowledgeable in the art.

What is claimed is:

1. A method for communicating streaming data between a plurality of users participating in a real-time communications event over a packet based data network, the method comprising the steps of:

a source using a locator table that correlates a plurality of requests to a plurality of different sinks to identify a first sink corresponding to a request to join a video conference, said request including at least a method, one or more method parameters, and a time to live value;

said source using a sink data repository to identify a first sink address corresponding to said first sink, said sink data repository comprising sink addresses and associated latency values for a plurality of different sinks, wherein said identified first sink address is selected so that said latency value associated with said identified first sink address satisfies said time to live value;

said source communicating said request to said first sink;

said first sink returning an error message if said time to live has expired, and if said time to live has not expired said first sink processing said request through one or more steps of:

acting as a resource by executing said method using said method parameters and communicating a response to said source, wherein executing said method includes connecting said source with a plurality of other sources at a conference bridge, each of said sources communicating real time streaming video and audio data to one another over said bridge whereby said plurality of sources conduct a video conference;

acting as a filter by forwarding said request to a second sink; and, redirecting said request back to said source for communicating to a second sink;

said source transmitting a reserve request to one or more of said first sinks, said reserve request including a maximum amount of latency and a time frame; and said one or more first sinks receiving said reserve request and returning a success response if said sink can provide a latency that satisfies said maximum latency value for said time frame, and otherwise returning a failure response.

2. A method as defined by claim 1 and wherein the step of said first sink processing said request includes one of the steps of:

said first sink reducing said time to live value if said time to live value is an amount of time, and if said time to live value is an elapsed time said first sink estimating downstream delay time between it and a node, said first sink reducing said time to live value by said downstream delay time, and said first sink forwarding said request to said node.

3. A method as defined by claim 1 wherein the step of said first sink processing said request includes:

said first sink using a second sink data repository to determine a sink address for a second sink, said second sink located on a different computer than said first sink, said first sink acting as a filter by forwarding said request to said second sink at said second sink address; and wherein said second sink returns an error message to said source if said time to live has expired and processes said request if said time to live has not expired.

4. A method as defined by claim 1 wherein said request comprises a first request, and further including the step of said sink receiving a second request including a time to live value, and wherein said sink processes the one of said first and second requests having the smaller time to live value before the other of said first and second requests.

5. A real time communications system for conducting a real-time communications sharing event between a plurality of users over a synchronized packet based data network, the system comprising a plurality of computers linked to one another for communication with one another, and further comprising:
- a plurality of sources linked to the network configured to communicate requests, each of said requests including at least a method and a time to live value, one each of said sources corresponding to one each of the users;
- a plurality of first nodes distributed across a plurality of the computers, each of said first nodes configured to receive requests, to execute said method contained in said request and to communicate a response following execution of said method if said time to live value has not expired, and configured to communicate an error message if said time to live value has expired, at least one of said first nodes receiving a request and executing said request;
- a plurality of second nodes distributed across a plurality of the computers, said second nodes configured to receive requests and to forward said requests to said first nodes if said time to live value has not expired and to return an error message if said time to live value has expired;
- wherein said plurality of first nodes and second nodes collectively are configured as a distributed configuration for conducting a real time communications sharing event on the network whereby each of the plurality of users may communicate real time streaming data to each of the other users,
- wherein each of said plurality of sources is configured to communicate a reserve request, specifying a maximum amount of latency and a time frame, and each of said first and second nodes is configured to return a success response if the node can guarantee a latency below the specified amount of latency during the specified time frame, otherwise the node returns a failure response, and
- wherein said time to live value is a clock time, said time to live value has expired if an actual clock time exceeds said time to live value clock time, otherwise said time to live value has not expired.

6. A real time communications system as defined by claim 5 and further comprising:
- a plurality of sink data depositories, each of said sink data depositories including address data for a plurality of said first and second nodes, each of said sources, said first nodes and said second nodes having access to at least one of said plurality of sink data depositories;
- a plurality of forwarding data depositories, each of said forwarding data depositories including a address data for a plurality of said first and second nodes correlated to said requests, at least each of said second nodes having access to at least one of said plurality of forwarding data depositories;
- a plurality of redirect data depositories, each of said redirect data depositories including address data for a plurality of said first and second nodes correlated to said requests, at least a portion of said first and second nodes having access to at least one of said redirect data depositories; and,
- wherein at least a portion of said first and second nodes are configured to function as both first and second nodes, and wherein at least a portion of said first nodes are redundant with one another whereby a particular request may be executed by any of said redundant first nodes, and wherein one of said second nodes when forwarding said particular request selects the one of said redundant first nodes that will result in the least delay.

7. A method as defined by claim 1, wherein said packet based data network is synchronized and said time to live value is a clock time, and further wherein said time to live value has expired if said time to live value exceeds an actual clock time, otherwise said time to live value has not expired.

8. A method as defined by claim 3, wherein said request comprises a first request, and further including a step of said second sink receiving a second request having a time to live value, and wherein said second sink processes the one of said first and second requests having the smaller time to live value before the other of said first and second requests.

9. A method as defined by claim 1, wherein said first sink forwarding said request to a second sink further comprises:
- said first sink determining a plurality of target second sinks to which said request could be forwarded;
- said first sink estimating a latency of each of said plurality of target second sinks; and
- said first sink forwarding said request to a one of the plurality of target second sinks having the smallest estimated latency.

10. A real time communications system as defined by claim 5, wherein one of said first nodes receives a first request having a first time to live value and a second request having a second time to live value, and wherein said one of said first nodes executes the one of said first and second requests having a time to live value nearer to said actual time before executing the other of said first and second requests.

11. A real time communications system as defined by claim 5, wherein each of said plurality of second nodes identifies a plurality of target first nodes to which a received request could be forwarded, estimates a latency for each of said plurality of target first nodes, and forwards said request to a one of the plurality of target first nodes having the smallest estimated latency.

12. A real time communications system as defined by claim 6, wherein each said sink data depository further includes an estimated latency value associated with said address data for each of said sources, said first nodes and said second nodes, and wherein a destination address for each said requested is selected such that said latency value associated with said destination address satisfies said time to live value of said request.

13. A method for communicating streaming data between a plurality of users participating in a real-time communications event over a packet based data network, the method comprising the steps of:
- a source identifying a first sink corresponding to a first request using a locator table that correlates a plurality of first requests to a plurality of different sinks, said first request including at least a method, one or more method parameters, and a time to live value;
- said source using a sink data repository to identify a first sink address corresponding to said first sink, said sink data repository comprising sink addresses and associated latency values for a plurality of different sinks, wherein said identified first sink address is selected so that said latency value associated with said identified first sink address satisfies said time to live value;
- said source communicating said first request to said first sink; and,
- said first sink returning an error message if said time to live has expired, and if said time to live has not expired said first sink processing said first request through one or more steps of:
  - acting as a resource by executing said method using said method parameters and communicating a response to said source;
  - acting as a filter by determining a plurality of target second sinks to which said first request could be forwarded, estimating a latency of each of said plurality of target second sinks, and forwarding said first request to a one of the plurality of target second sinks having the smallest estimated latency by using a second sink data repository to determine a sink address for the second sink having the smallest latency; and redirecting said first request back to said source for communicating to a second sink, wherein when said source transmits a reserve request including a maximum amount latency value and a time frame to one or more of said different sinks, said one or more first sinks return a success response if said sink can provide a latency lower than said maximum latency value for said time frame, and otherwise returning a failure response, wherein said first request comprises a request to join a video conference, and wherein the step of processing said first request comprises connection of said source with a plurality of other sources at a conference bridge, each of said sources communicating real time streaming video and audio data to one another over said bridge whereby said plurality of sources conduct a video conference.

* * * * *